United States Patent
Nagase

(10) Patent No.: US 12,218,546 B2
(45) Date of Patent: Feb. 4, 2025

(54) STATOR AND MANUFACTURING METHOD OF THE STATOR

(71) Applicant: SUBARU CORPORATION, Tokyo (JP)

(72) Inventor: Kimihiro Nagase, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 222 days.

(21) Appl. No.: 17/994,149

(22) Filed: Nov. 25, 2022

(65) Prior Publication Data

US 2023/0208217 A1    Jun. 29, 2023

(30) Foreign Application Priority Data

Dec. 27, 2021    (JP) .................. 2021-212632

(51) Int. Cl.
| | |
|---|---|
| *H02K 1/16* | (2006.01) |
| *B60K 1/00* | (2006.01) |
| *H02K 15/02* | (2006.01) |

(52) U.S. Cl.
CPC .............. *H02K 1/165* (2013.01); *B60K 1/00* (2013.01); *H02K 15/024* (2013.01)

(58) Field of Classification Search
CPC .................................. H02K 1/165; B60K 1/00
USPC ................................................... 310/216.011
See application file for complete search history.

(56) References Cited

U.S. PATENT DOCUMENTS

| | | | | |
|---|---|---|---|---|
| 2014/0042862 | A1* | 2/2014 | Ishigami | H02K 3/12 310/187 |
| 2020/0021170 | A1* | 1/2020 | Nakayama | H02K 15/024 |
| 2020/0052533 | A1 | 2/2020 | Fratila et al. | |
| 2020/0091787 | A1* | 3/2020 | Hino | H02K 11/25 |
| 2020/0220396 | A1 | 7/2020 | Uchida | |
| 2021/0099039 | A1* | 4/2021 | Hanaoka | H02K 1/16 |
| 2021/0218306 | A1* | 7/2021 | Fukunaga | H02K 21/14 |
| 2021/0265887 | A1* | 8/2021 | Kojima | H02K 3/12 |
| 2021/0359562 | A1* | 11/2021 | Katsume | H02K 3/12 |
| 2021/0408856 | A1* | 12/2021 | Fukunaga | H02K 1/16 |
| 2022/0052586 | A1* | 2/2022 | Nagase | H02K 3/12 |
| 2022/0060093 | A1* | 2/2022 | Fukunaga | H02K 3/12 |
| 2022/0077728 | A1* | 3/2022 | Hanaoka | H02K 3/48 |
| 2022/0085681 | A1* | 3/2022 | Kojima | H02K 3/505 |
| 2022/0181938 | A1* | 6/2022 | Nakashima | H02K 3/24 |
| 2023/0155434 | A1* | 5/2023 | Omagari | H02K 3/12 310/208 |

(Continued)

FOREIGN PATENT DOCUMENTS

| | | |
|---|---|---|
| JP | 2016-129450 A | 7/2016 |
| JP | 2017-077125 A | 4/2017 |

(Continued)

*Primary Examiner* — Rashad H Johnson
(74) *Attorney, Agent, or Firm* — MCGINN I.P. LAW GROUP, PLLC.

(57) ABSTRACT

A stator for a rotary electric machine includes a stator core and a stator coil. The stator core includes plate groups circumferentially shifted from and stacked on one another. The stator core has slots. The stator coil includes segment conductors inserted in the slots respectively. The stator coil is assembled with the stator core. The plate groups each have, as grooves that form the slots, first grooves, and second grooves wider than the first grooves. At least one of the slots is configured with one or more of the first grooves and one or more of the second grooves.

15 Claims, 25 Drawing Sheets

(56) References Cited

U.S. PATENT DOCUMENTS

2023/0208217 A1* 6/2023 Nagase ................ H02K 15/024
310/216.011

FOREIGN PATENT DOCUMENTS

| JP | 2020-518218 A | 6/2020 |
| JP | 2020-114078 A | 7/2020 |

* cited by examiner

[U-PHASE COIL]

[PLATE STACKING STEP]

STATOR AND MANUFACTURING METHOD OF THE STATOR

CROSS-REFERENCE TO RELATED APPLICATIONS

The present application claims priority from Japanese Patent Application No. 2021-212632 filed on Dec. 27, 2021, the entire contents of which are hereby incorporated by reference.

BACKGROUND

The disclosure relates to a stator of a rotary electric machine and a manufacturing method of the stator.

A rotary electric machine, such as an electric motor and a generator, includes: a stator including a stator core and a stator coil; and a rotor accommodated in the stator (see Japanese Unexamined Patent Application Publication (Translation of PCT Application) (JP-T) No. 2020-518218, Japanese Unexamined Patent Application Publication (JP-A) No. 2016-129450, JP-A No. 2017-77125, and JP-A No. 2020-114078). As the stator coil wound on the stator core, there is proposed a stator coil including segment coils.

SUMMARY

An aspect of the disclosure provides a stator for a rotary electric machine including a stator core and a stator coil. The stator core includes plate groups circumferentially shifted from and stacked on one another. The stator core has slots. The stator coil includes segment conductors inserted in the slots respectively. The stator coil is assembled with the stator core. The plate groups each have, as grooves that form the slots, first grooves, and second grooves wider than the first grooves. At least one or more of the slots is configured with one of the first grooves and one or more of the second grooves.

Another aspect of the disclosure provides a method of manufacturing a stator for a rotary electric machine. The method includes: stacking core plates to form a stator core comprising plate groups circumferentially shifted from and stacked on one another; and inserting segment conductors composing a conductor group respectively into slots formed in the stator core. The plate groups each have, as grooves that form the slots, first grooves, and second grooves wider than the first grooves. At least one of the slots is configured with one or more of the first grooves and one or more of the second grooves.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Segment coils that constitute a stator coil are inserted into slots formed in a stator core. Varnish is filled in gaps between the slots and the segment coils. This varnish is cured to secure the segment coils in the slots. However, securing the segment coils with the varnish has been a cause of deviating a natural value, namely, a natural frequency of the stator. That is, it is difficult to fill the varnish in entire areas of the slots, and the segment coils are not uniformly secured at predetermined positions with the varnish. Consequently, manufactured stators have a deviation in the natural frequency. In view of this, the deviation in the natural frequency of the stators is to be prevented.

It is desirable to prevent a deviation in a natural frequency of a stator.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Application Example of Rotary Electric Machine

Figure 1:
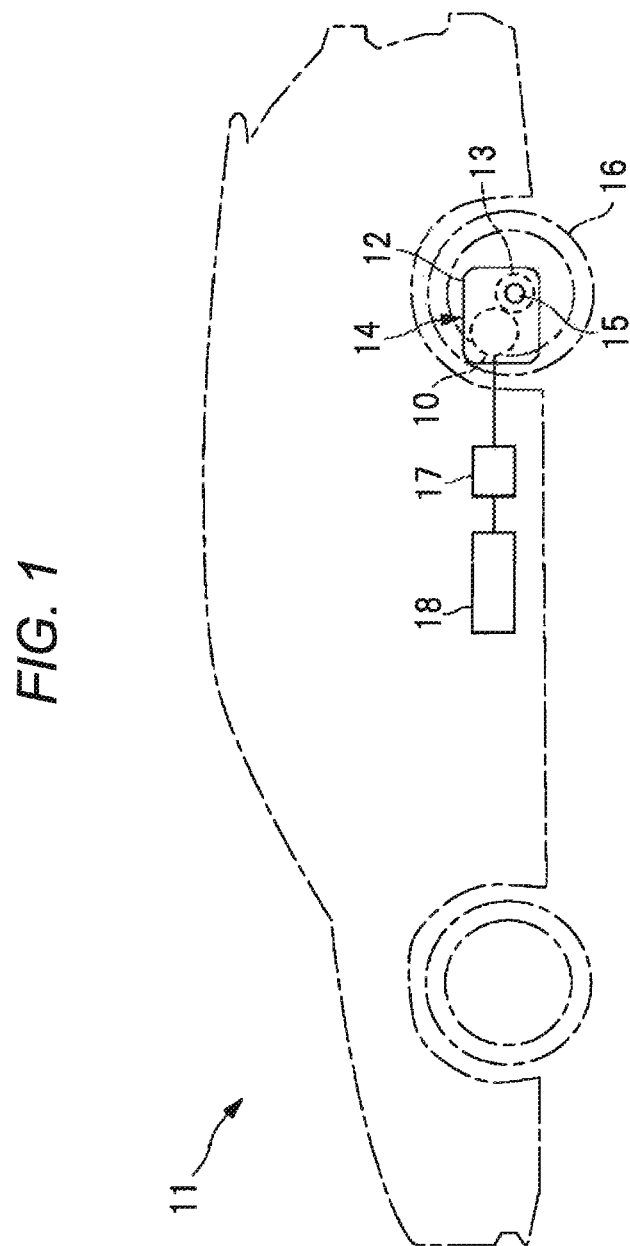
FIG. 1 is a diagram illustrating a vehicle where a rotary electric machine is mounted.

FIG. 1 is a diagram illustrating a vehicle 11 where a rotary electric machine 10 is mounted. As illustrated in FIG. 1, the vehicle 11 includes an electric axle 14 including components such as the rotary electric machine 10 and a differential mechanism 13, which are accommodated in an axle case 12. The rotary electric machine 10 and the differential mechanism 13 are coupled to each other via a gear train, not illustrated. A wheel 16 is coupled to the differential mechanism 13 via an axle 15. A battery 18 is coupled to the rotary electric machine 10, which is a motor-generator, via an inverter 17, which is a power converter. It is noted that although the rotary electric machine 10 disposed in the electric axle 14 is given as an example of the rotary electric machine, this is not to be construed in a limiting sense. A rotary electric machine disposed on a transmission, for example, may be given, and a rotary electric machine disposed in an apparatus other than the vehicle may be given.

Configuration of Rotary Electric Machine

Figure 2:
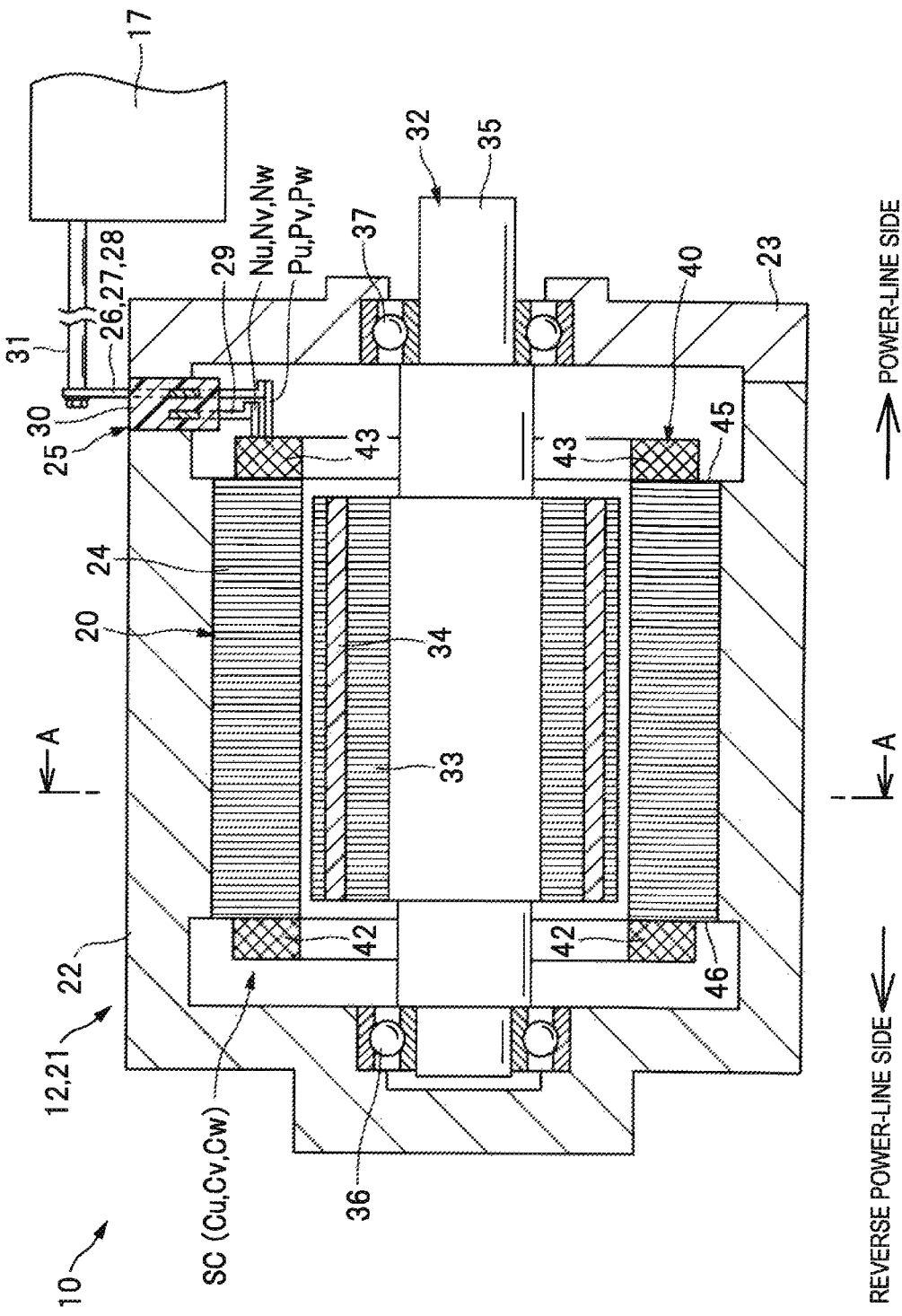
FIG. 2 is a cross-sectional view of the rotary electric machine, illustrating a configuration example thereof.

FIG. 2 is a cross-sectional view of the rotary electric machine 10, illustrating a configuration example thereof. The rotary electric machine 10 illustrated in FIG. 2 includes a stator 20 according to an embodiment. As illustrated in FIG. 2, the rotary electric machine 10 includes a motor case 21 that forms a part of the axle case 12. The motor case 21 includes a case body 22 of a bottomed, hollow cylindrical shape, and an end cover 23 that closes an open end of the case body 22. The stator 20 secured in the case body 22 includes a stator core 24 of a hollow cylindrical shape including stacked electromagnetic steel sheets, and a three-phase stator coil SC wound on the stator core 24.

A bus bar unit 25 is coupled to the stator coil SC. This bus bar unit 25 includes: three power bus bars 26 to 28 coupled to three power points Pu, Pv, and Pw of the stator coil SC; a neutral bus bar 29 that couples three neutral points Nu, Nv, and Nw of the stator coil SC to one another; and an insulating member 30 to hold these bus bars 26 to 29. End portions of the power bus bars 26 to 28 protrude outward from the motor case 21, and a power cable 31 extending from the inverter 17 is coupled to each of the power bus bars 26 to 28.

A rotor 32 of a solid cylindrical shape is rotatably accommodated in a center of the stator core 24. This rotor 32 includes: a rotor core 33 of a hollow cylindrical shape including stacked electromagnetic steel sheets; permanent magnets 34 buried in the rotor core 33; and a rotor shaft 35 secured in a center of the rotor core 33. One end of the rotor shaft 35 is supported by a bearing 36 disposed on the case body 22, and the other end of the rotor shaft 35 is supported by a bearing 37 disposed on the end cover 23.

Configuration of Stator

Figure 3:
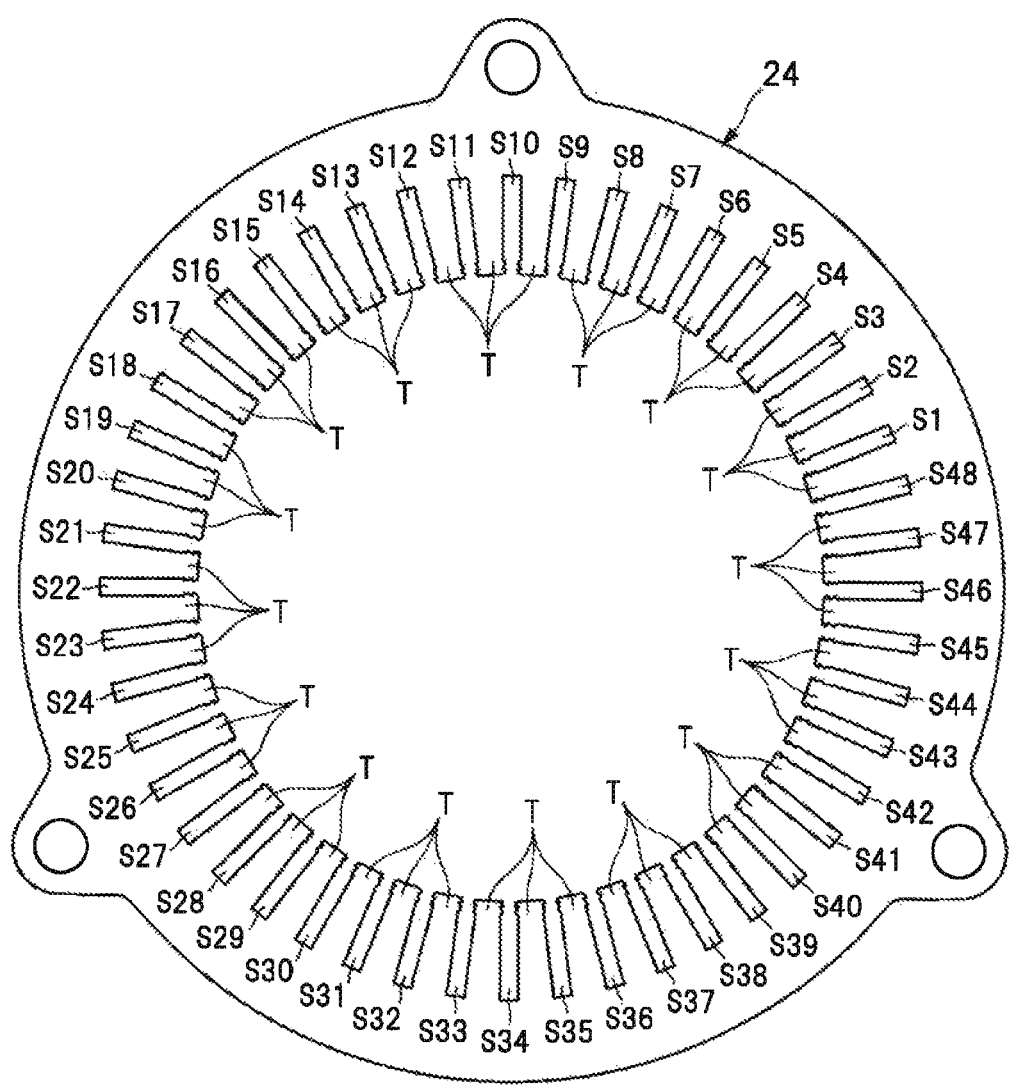
FIG. 3 is a cross-sectional view of a stator core, taken along line A-A in FIG. 2.
Figure 4:
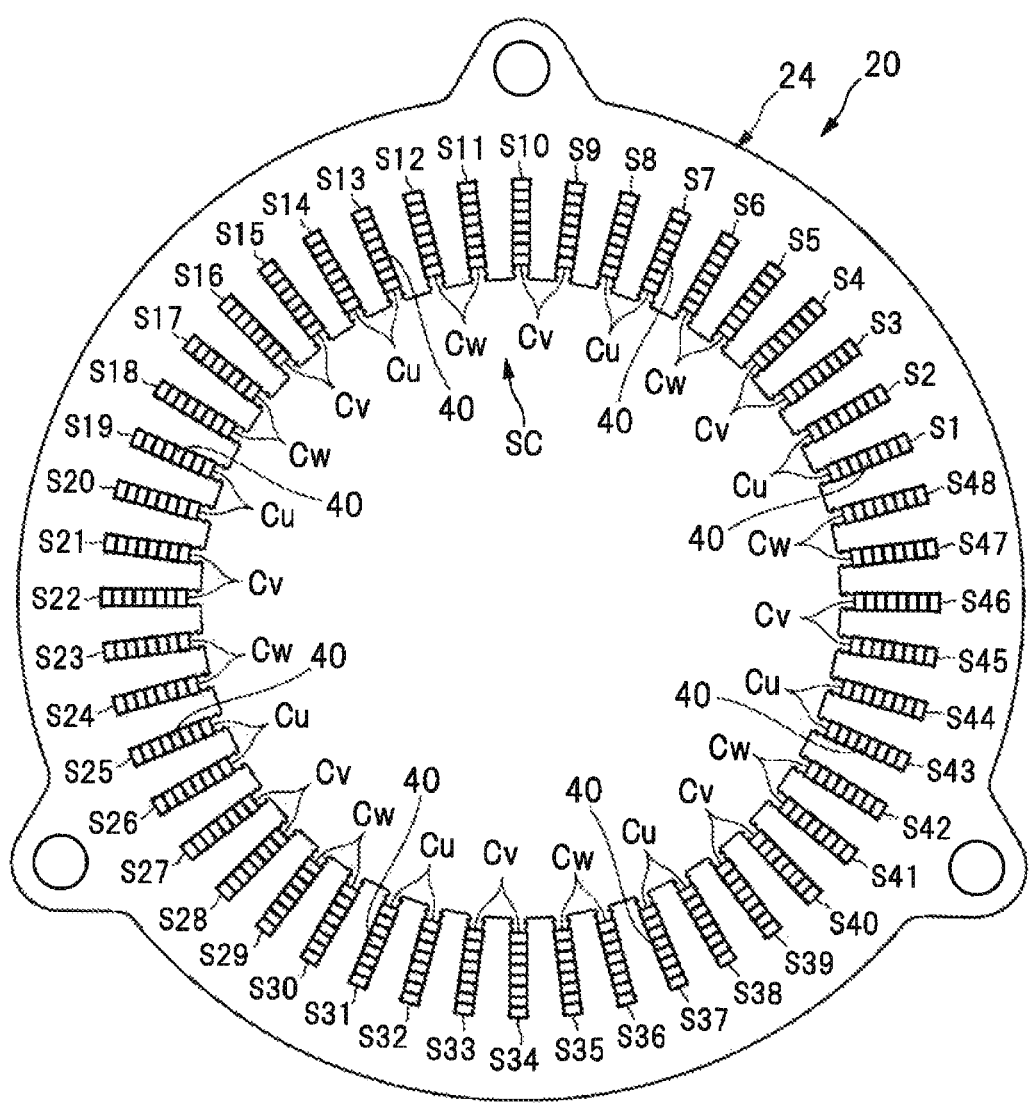
FIG. 4 is a cross-sectional view of a stator, taken along line A-A in FIG. 2.
Figure 5:
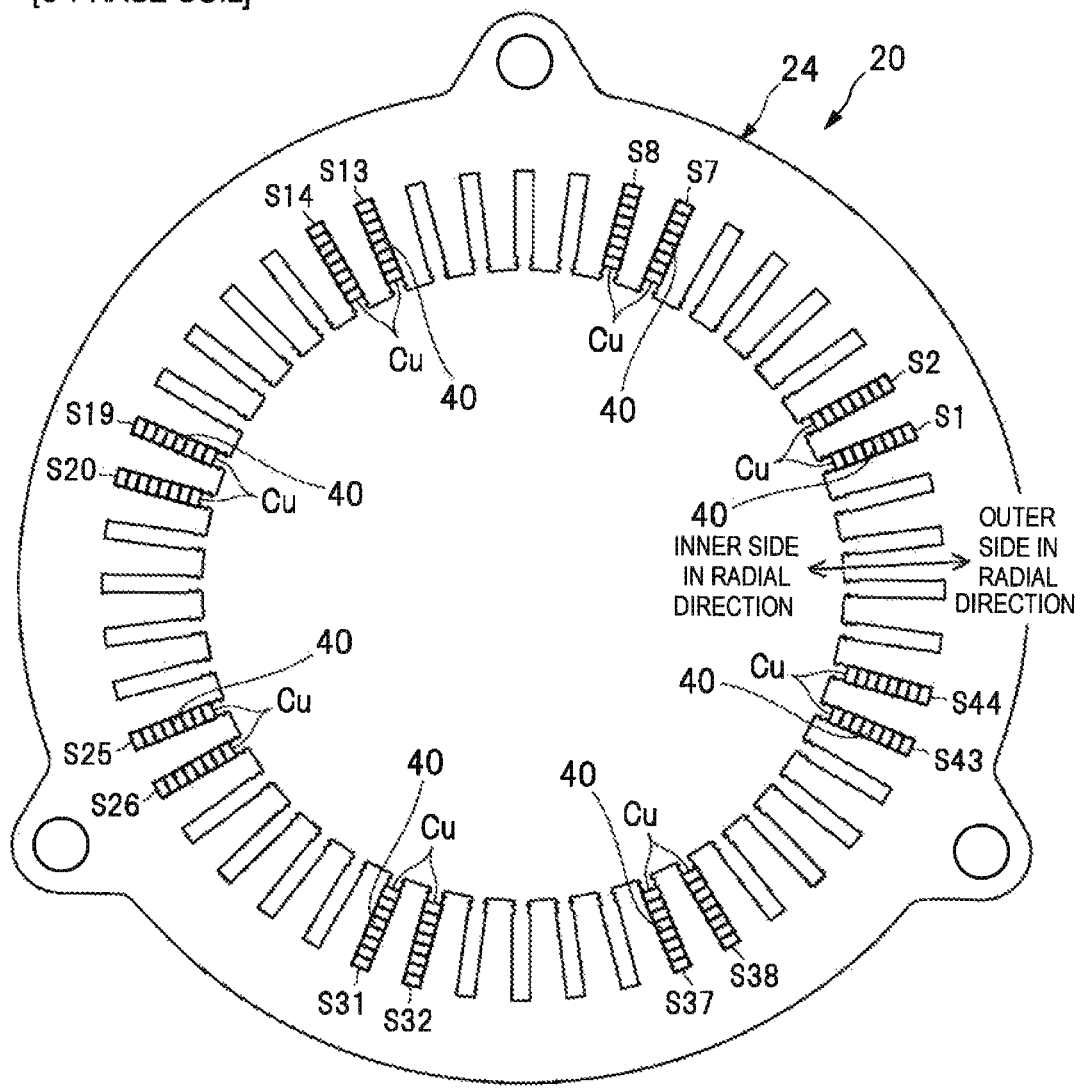
FIG. 5 is a cross-sectional view of the stator core including phase windings of a U phase.
Figure 6:
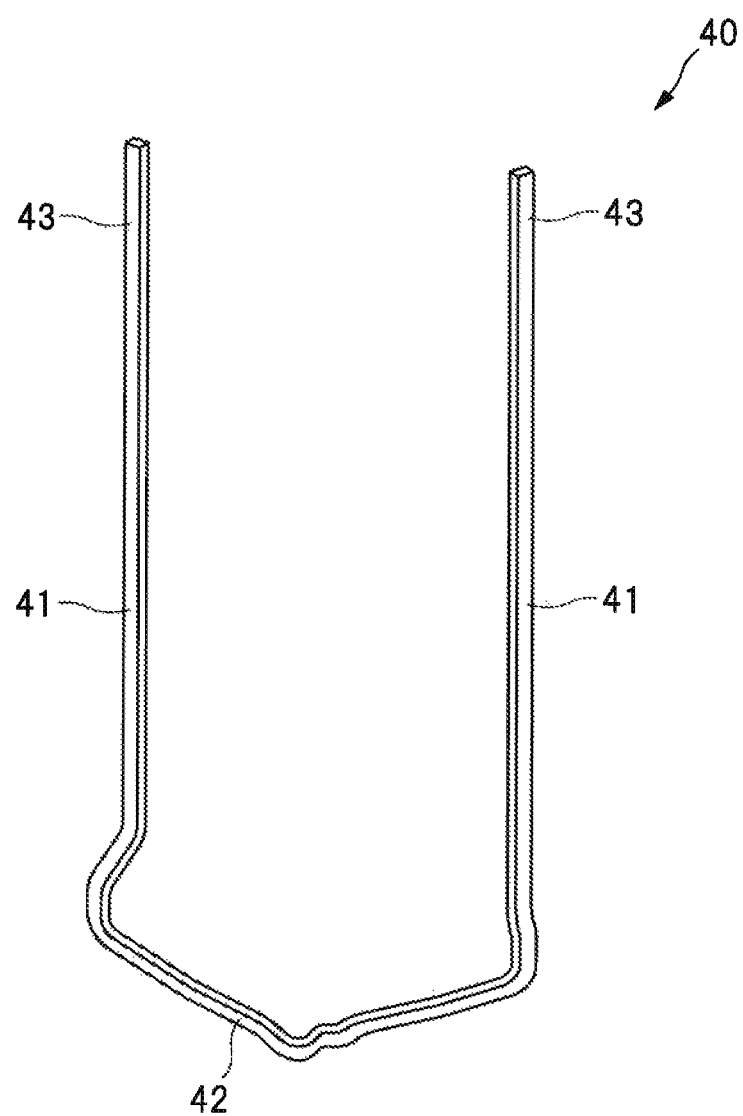
FIG. 6 is a perspective view of an example of a segment coil.

FIG. 3 is a cross-sectional view of the stator core 24, taken along line A-A in FIG. 2. FIG. 4 is a cross-sectional view of the stator 20, taken along line A-A in FIG. 2. FIG. 5 is a cross-sectional view of the stator core 24 with a phase winding of a U phase (hereinafter referred to as U-phase coil Cu). FIG. 6 is a perspective view of an example of a segment coil 40. As described later, the stator coil SC includes a phase winding of a V phase (hereinafter referred to as V-phase coil Cv) and a phase winding of a W phase (hereinafter referred to as W-phase coil Cw) as well as the U-phase coil Cu. The U-phase coil Cu, the V-phase coil Cv, and the W-phase coil Cw in the drawings have an identical coil configuration, and are assembled with the stator core 24 and have phases displaced from one another by 120°.

As illustrated in FIG. 3, teeth T are formed on an inner-peripheral portion of the stator core 24 and disposed at predetermined intervals in a circumferential direction. That is, slots S1 to S48 are formed in the inner-peripheral portion of the stator core 24 at predetermined intervals in the circumferential direction. As illustrated in FIG. 4, each of the slots S1 to S48 contains the segment coils 40. The segment coils 40 are coupled to one another to constitute the stator coil SC. In one embodiment, the segment coils 40 may serve as "segment conductors". As illustrated in FIGS. 4 and 5, the segment coils 40 that constitute the U-phase coil Cu are held in the slots S1, S2, S7, S8 . . . , the segment coils 40 that constitute the V-phase coil. Cv are held in the slots S3, S4, 39, S10 . . . , and the segment coils 40 that constitute the W-phase coil Cw are held in the slots S5, S6, S11, S12 . . . .

As illustrated in FIG. 6, each of the segment coils 40 bent substantially in a U shape includes a pair of coil sides 41 separate from each other by a predetermined pitch. One of the coil sides 41 is held in one of the slots (e.g., the slot S7), and the other of the coil sides 41 is held in another slot (e.g., the slot S13) separate by the predetermined pitch. The segment coil 40 also includes an end portion 42 that couples the pair of coil sides 41 to each other, and joint end portions 43 that respectively extend from the pair of coil sides 41. It is noted that the segment coil 40 is made of a rectangular wire of a conductive material such as copper, and that the segment coil 40 except distal ends of the joint end portions 43 is coated with an insulating film of enamel, resin or the like. The end portion 42 of the segment coil 40 is not limited to the illustrated shape but is bent in various shapes in accordance with an assembling position with respect to the stator core 24.

Figure 7:
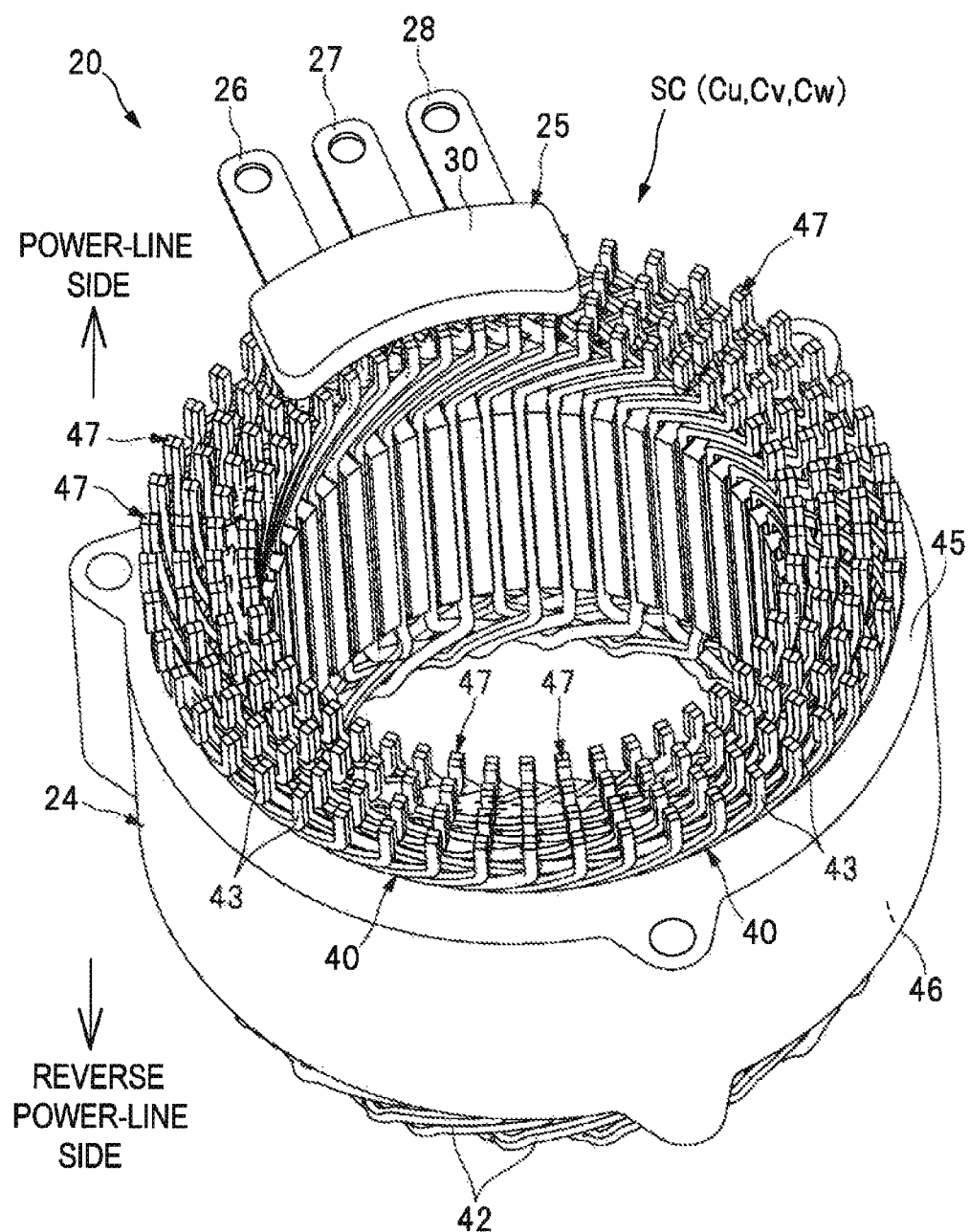
FIG. 7 is a perspective view of an example of the stator.
Figure 8:
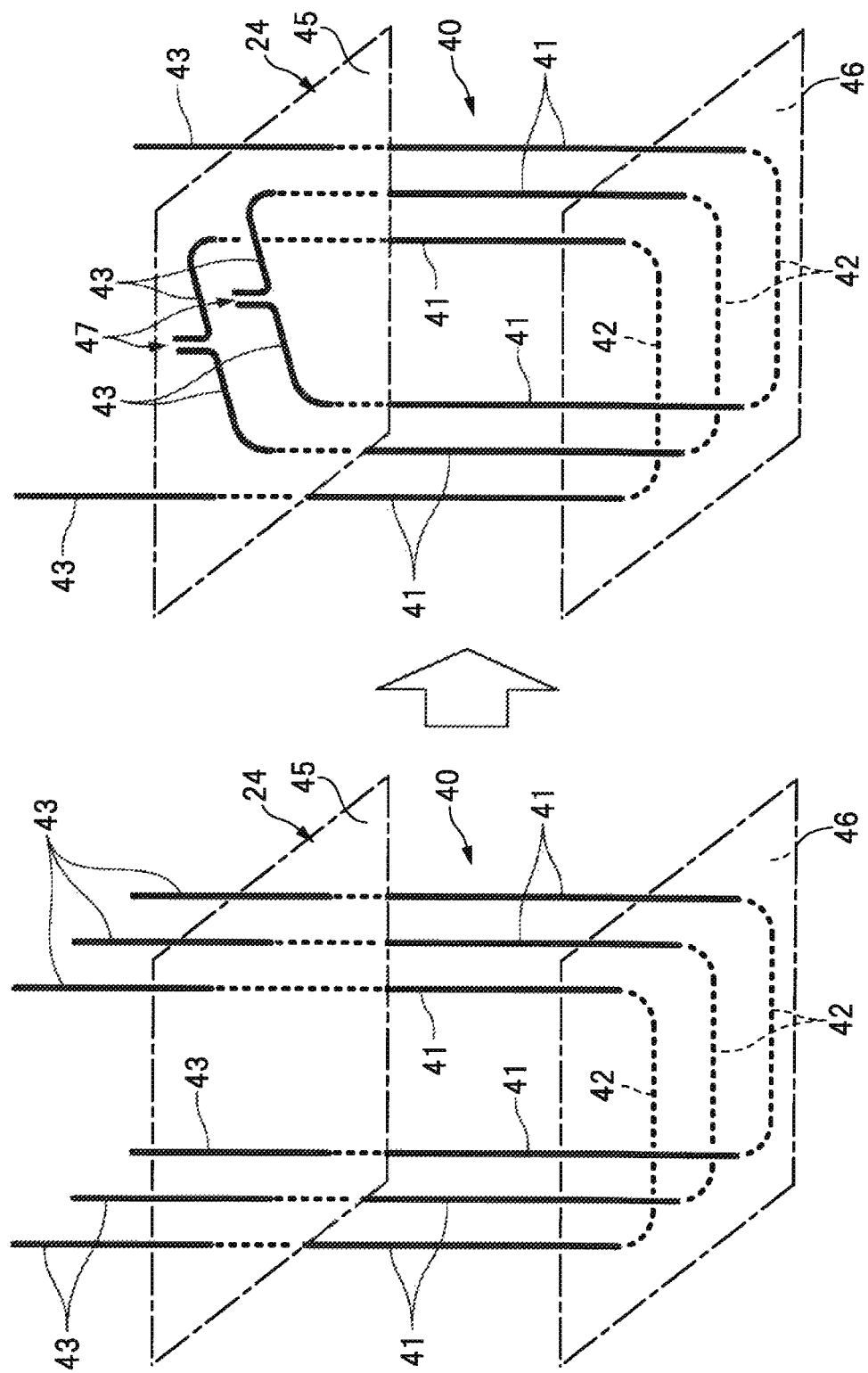
FIG. 8 is a diagram illustrating an example of a coupling configuration of the segment coils.

FIG. 7 is a perspective view of an example of the stator 20. FIG. 8 is a diagram illustrating an example of a coupling state of the segment coils 40. As illustrated in FIGS. 4 and 7, the segment coils 40 are assembled in each of the slots S1 to S48 of the stator core 24. As illustrated in FIGS. 7 and 8, the joint end portions 43 of the segment coils 40 protrude from one end surface 45 of the stator core 24 to a power-line side, and the end portions 42 of the segment coils 40 protrude from the other end surface 46 of the stator core 24 to a reverse power-line side.

As illustrated in FIG. 8, the joint end portions 43 that protrude from the one end surface 45 of the stator core 24 are bent to come into contact with the joint end portions 43 of other segment coils 40 and become conductor joint portions 47. Then, the individual conductor joint portions 47 undergo TIG welding, for example, so as to couple the segment coils 40 to each other with the conductor joint portions 47. That is, the segment coils 40 constitute the U-phase coil Cu, the segment coils 40 constitute the V-phase coil Cv, and the segment coils 40 constitute the W-phase coil Cw. It is noted that the conductor joint portions 47 after welded undergo insulating processing to form a resin film, for example, to coat the conductor.

Figure 9:
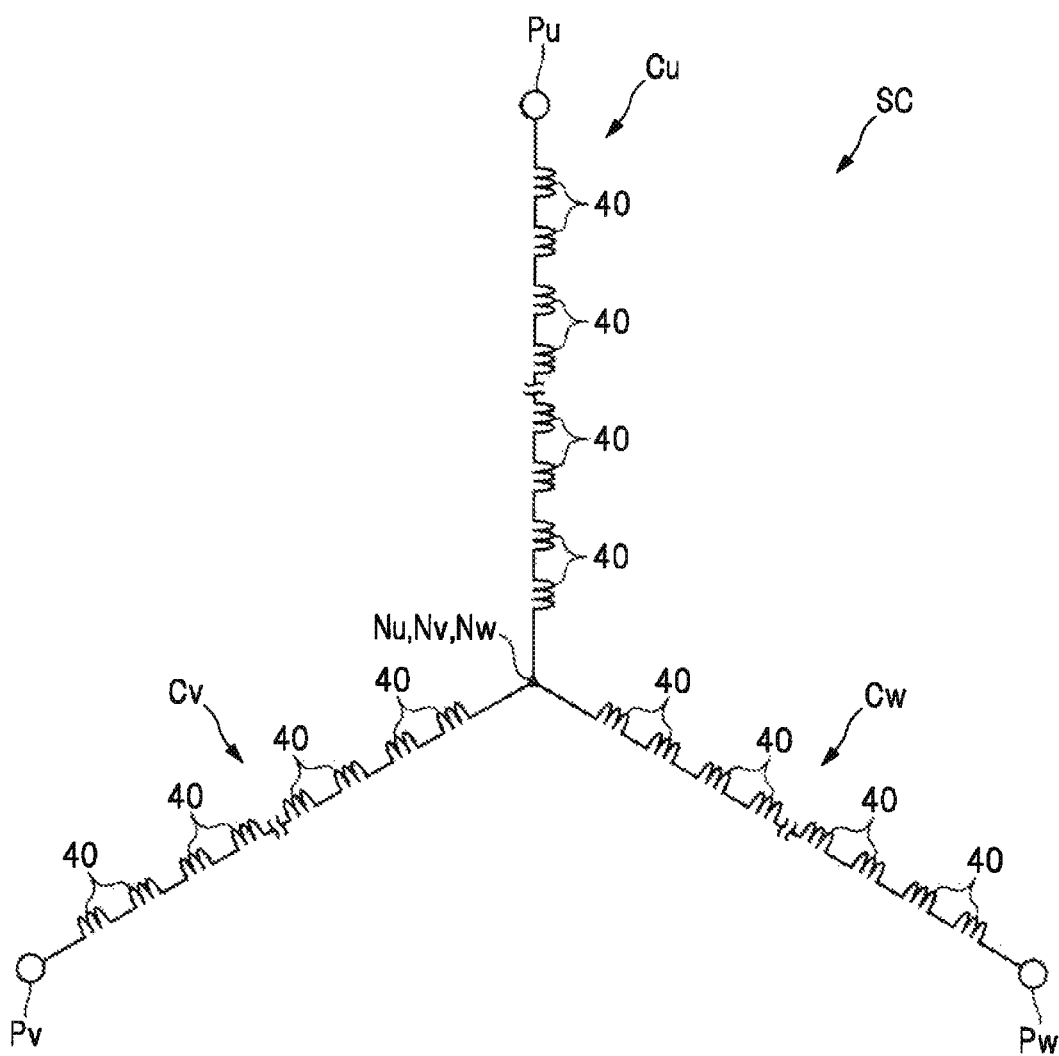
FIG. 9 is a diagram illustrating an example of a connection state of a stator coil.

FIG. 9 is a diagram illustrating an example of a connection state of the stator coil SC. As illustrated in FIG. 9, the stator coil SC is configured with the U-phase coil Cu, the V-phase coil Cv, and the W-phase coil Cw. The U-phase coil Cu includes the segment coils 40 connected to one another in series. One end of the U-phase coil Cu serves as the power point Pu, and the other end of the U-phase coil Cu serves as the neutral point Nu. The V-phase coil Cv includes the segment coils 40 connected to one another in series. One end of the V-phase coil Cv serves as the power point Pv, and the other end of the V-phase coil Cv serves as the neutral point Nv. The W-phase coil Cw includes the segment coils 40 connected to one another in series. One end of the W-phase coil Cw serves as the power point Pw, and the other end of the W-phase coil Cw serves as the neutral point Nw. The neutral point Nu of the U-phase coil Cu, the neutral point Nv of the V-phase coil Cv, and the neutral point Nw of the W-phase coil Cw are coupled to one another. These phase coils Cu, Cv, and Cw constitute the stator coil SC.

Manufacturing Method of Stator

Figure 10:
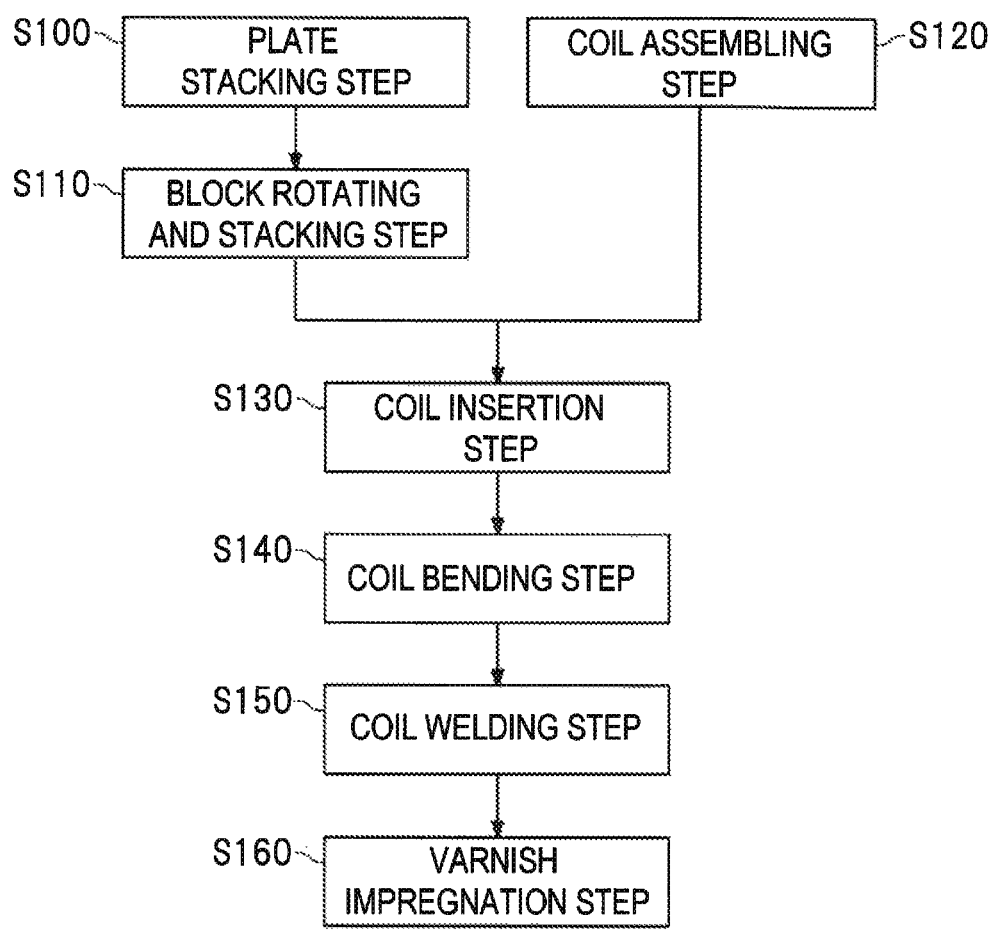
FIG. 10 is a flowchart of an example of a manufacturing method of the stator.
Figure 11:
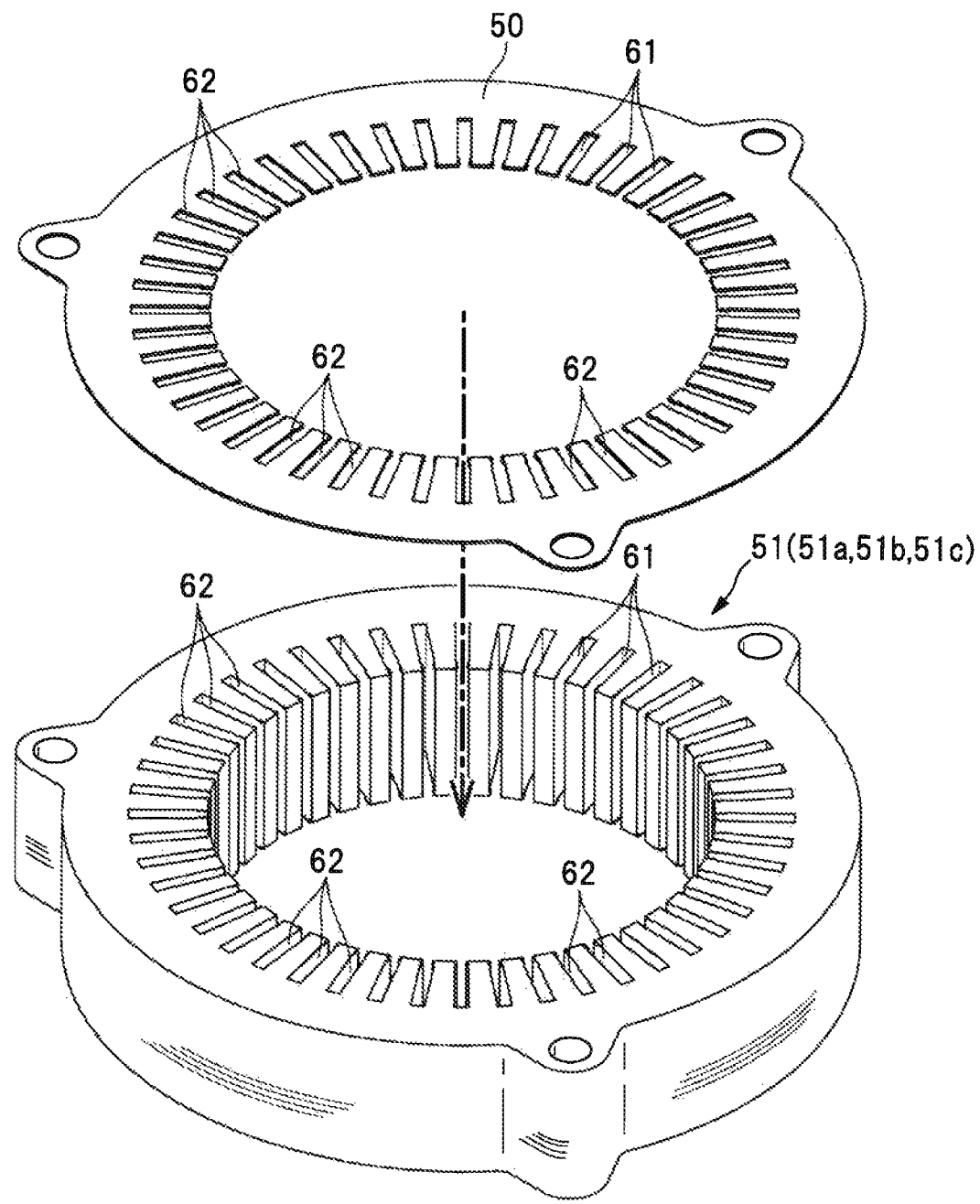
FIG. 11 is a diagram illustrating an example as to how a plate stacking step is performed.
Figure 12:
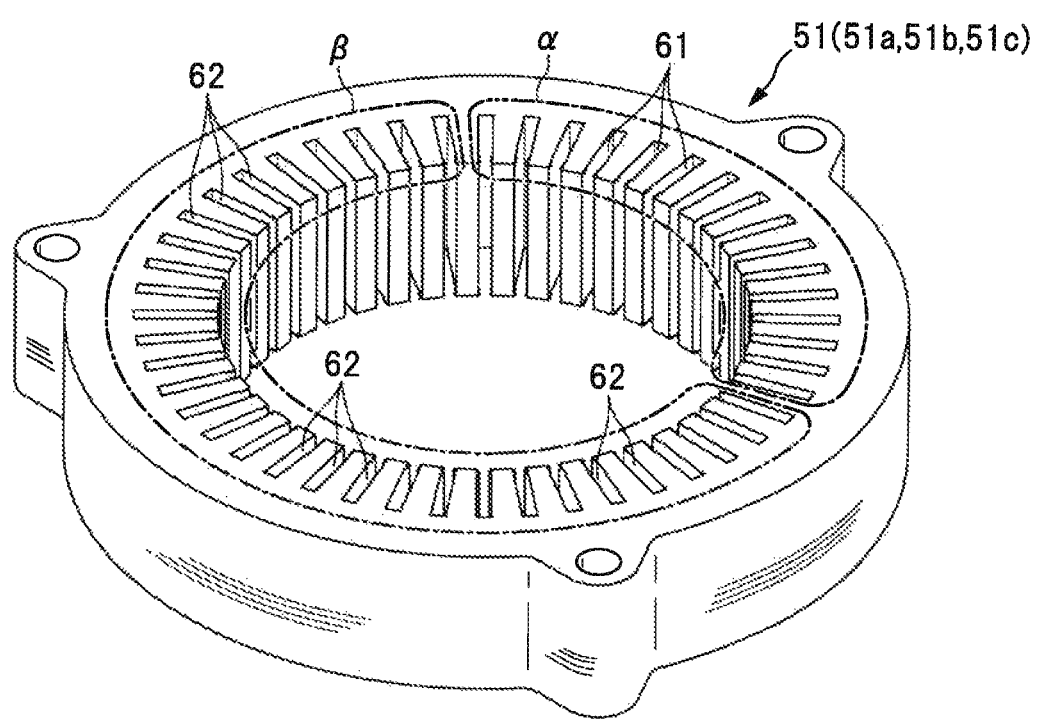
FIG. 12 is a diagram illustrating an example of a core block manufactured by undergoing the plate stacking step.
Figure 13:
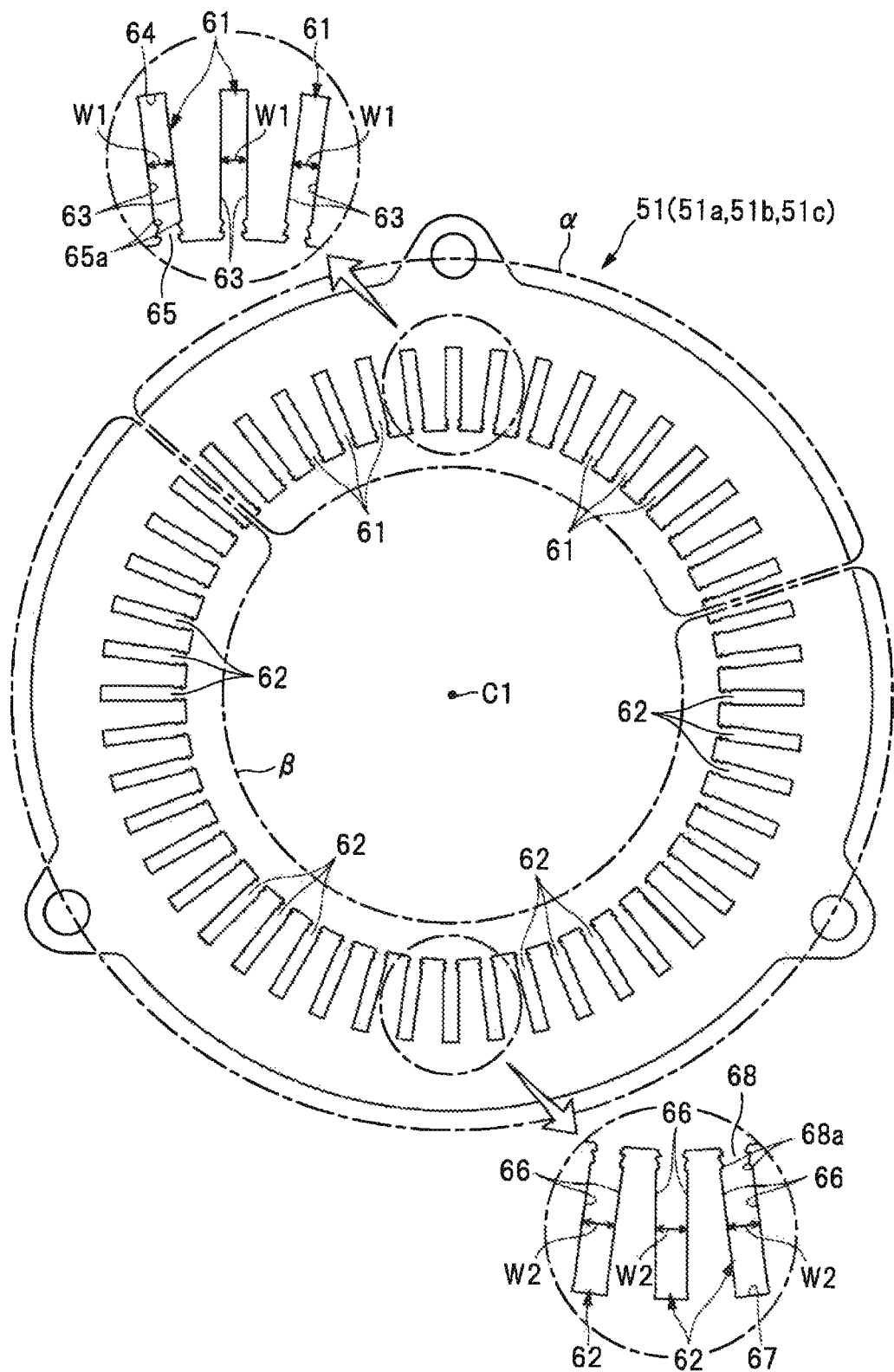
FIG. 13 is a diagram illustrating the example of the core block manufactured by undergoing the plate stacking step.
Figure 14:
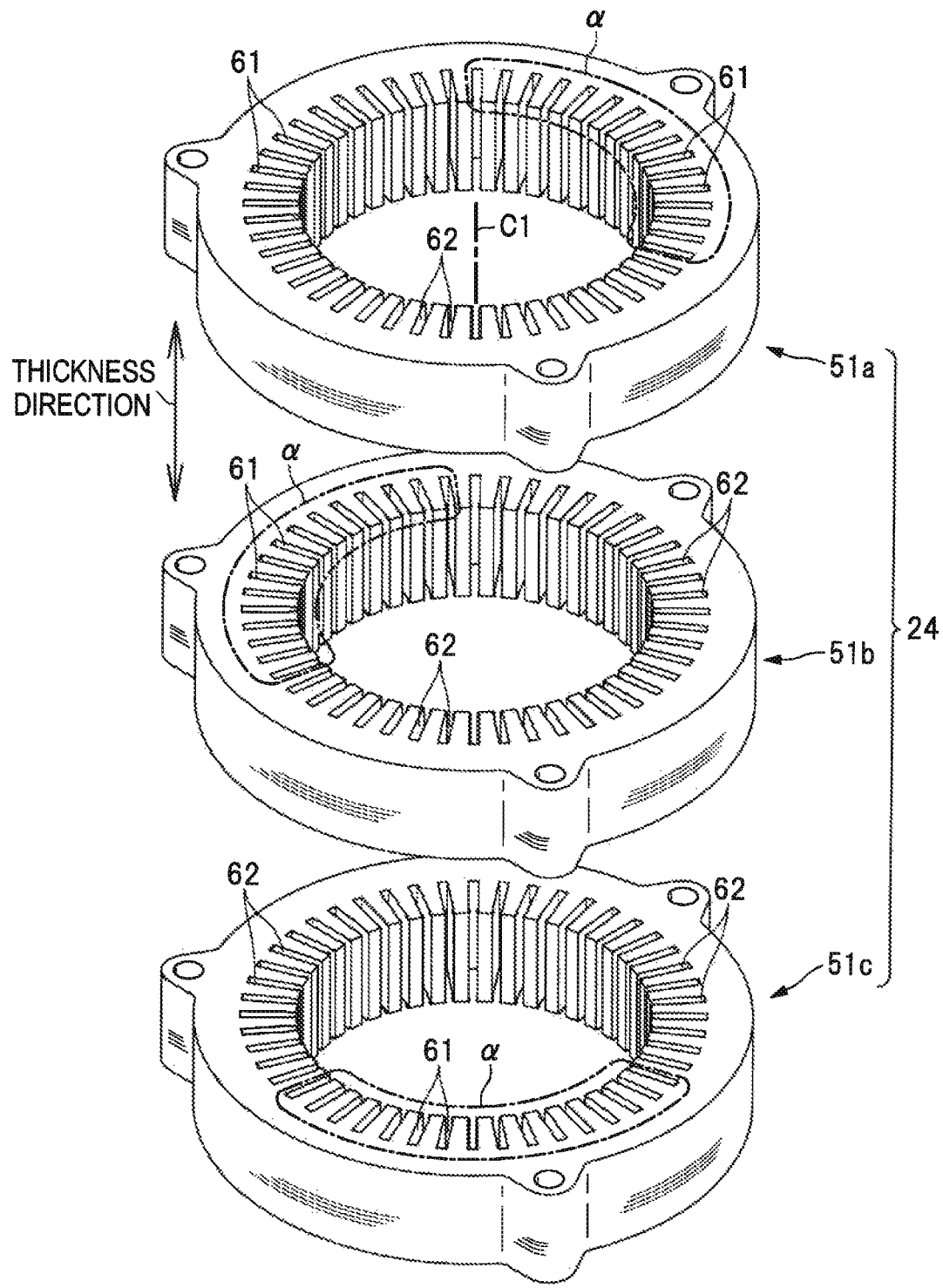
FIG. 14 is a diagram illustrating an example as to how a block rotating and stacking step is performed.
Figure 15:
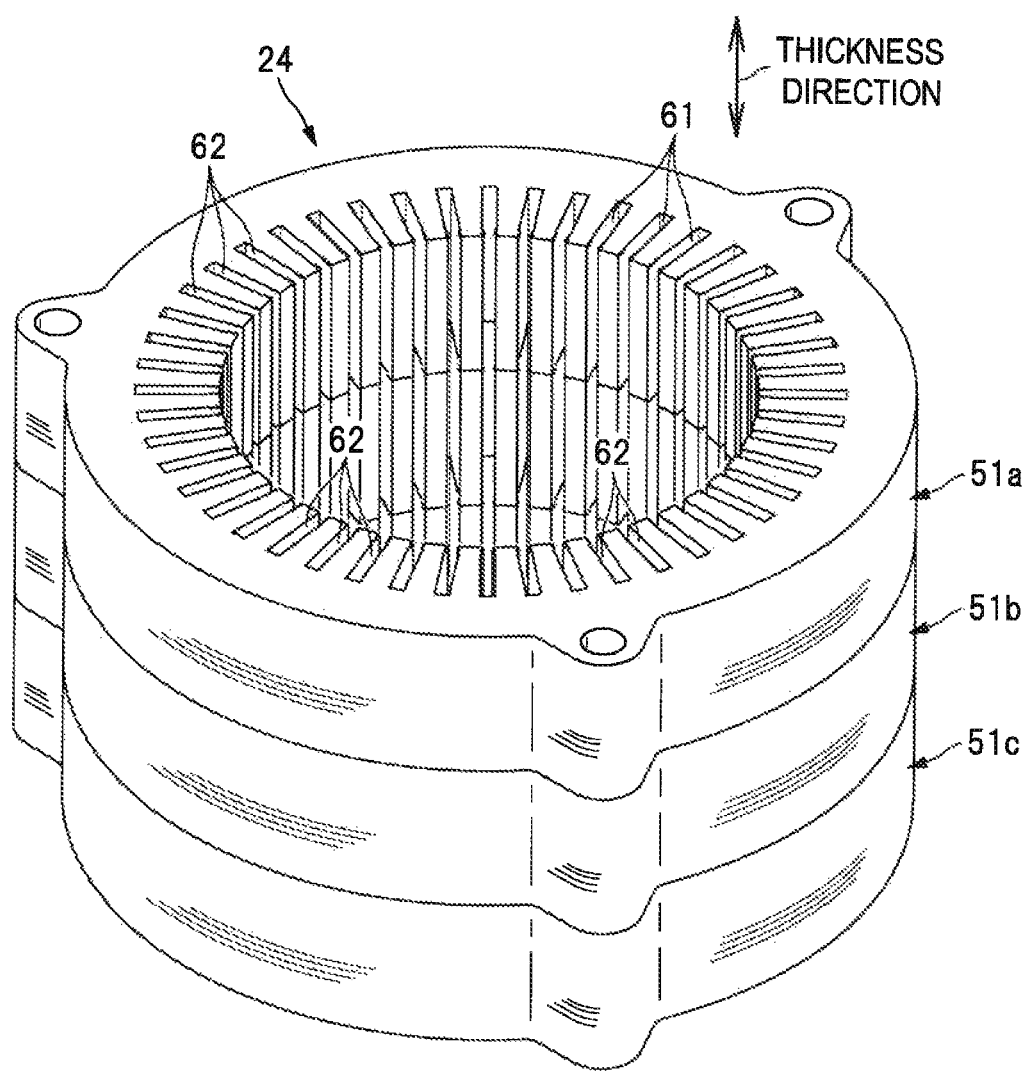
FIG. 15 is a diagram illustrating an example of the stator core manufactured by undergoing the block rotating and stacking step.

Next, a manufacturing method of the stator 20 according to an embodiment will be described. FIG. 10 is a flowchart of an example of the manufacturing method of the stator 20. FIG. 11 is a diagram illustrating an example as to how a plate stacking step S100 is performed. FIGS. 12 and 13 are diagrams illustrating an example of a core block 51 manufactured by undergoing the plate stacking step S100. FIG. 14 is a diagram illustrating an example as to how a block rotating and stacking step S110 is performed. FIG. 15 is a diagram illustrating an example of the stator core 24 manufactured by undergoing the block rotating and stacking step S110.

Plate Stacking Step, Block Rotating and Stacking Step

As illustrated in FIG. 10, manufacturing steps of the stator 20 include: the plate stacking step S100 of stacking core plates 50 so as to manufacture the core blocks 51; and the block rotating and stacking step S110 of circumferentially shifting and stacking each of the core blocks 51 so as to manufacture the stator core 24. The two steps, namely, the plate stacking step S100 and the block rotating and stacking step S110 constitute a core stacking step of stacking the core plates 50 so as to form the stator core 24.

As illustrated in FIG. 11, at the plate stacking step S100, a press device, not illustrated, punches out the annular core plates 50 from rolled material of an electromagnetic steel sheet, and the core plates 50 are stacked to manufacture the core blocks 51. In one embodiment, the core blocks 51 may serve as "plate groups". It is noted that in order to join each adjacent pair of the stacked core plates 50 together, the core plates 50 are caulked, welded, or bonded, for example.

As illustrated in FIGS. 12 and 13, grooves 61 and 62 corresponding to the above-described slots S1 to S48 are formed in an inner-peripheral portion of the core block 51. The grooves 61 and 62 formed in the core block 51 include first grooves 61 having a width set at "W1", and second grooves 62 having a width set at "W2" greater than "W1". As indicated by a range α, the first grooves 61 cover a predetermined angle (120°). As indicated by a range β, the second grooves 62 cover a predetermined angle (240°).

It is noted that as illustrated in an enlarged portion in FIG. 13, the first grooves 61 each include: a pair of side surfaces 63 disposed in parallel to each other; a bottom surface 64 disposed perpendicular to the pair of side surfaces 63; and an opening 65 opened to an inner side in a radial direction of the core block 51 and including engagement claws 65a. Similarly, the second grooves 62 each include: a pair of side surfaces 66 disposed in parallel to each other; a bottom surface 67 disposed perpendicular to the pair of side surfaces 66; and an opening 68 opened to an inner side in the radial direction of the core block 51 and including engagement claws 68a.

In the following description, in order to discriminate the three core blocks 51 that constitute the stator core 24, the core blocks will be denoted by reference symbols 51a, 51b, and 51c. It is noted that the core blocks 51a, 51b, and 51c have an identical shape. As illustrated in FIGS. 14 and 15, at the block rotating and stacking step S110, the three core blocks 51a, 51b, and 51c are stacked in a thickness direction, and each adjacent pair of the core blocks 51a, 51b, and 51c are joined together to manufacture the stator core 24. As illustrated in FIG. 14, at the block rotating and stacking step S110, the core blocks 51a, 51b, and 51c are each circumferentially shifted by 120° and stacked. In this manner, the core blocks 51a, 51b, and 51c are each circumferentially shifted by 120° and stacked (rotated and stacked) so that as indicated by the range α in FIG. 14, the first grooves 61 of the core blocks 51a, 51b, and 51c do not overlap one another in the thickness direction.

That is, the first grooves 61 of the core block 51a overlap the second grooves 62 of the other core blocks 51b and 51c, the first grooves 61 of the core block 51b overlap the second grooves 62 of the other core blocks 51a and 51c, and the first grooves 61 of the core block 51c overlap the second grooves 62 of the other core blocks 51a and 51b. It is noted that at the block rotating and stacking step S110, in order to join each adjacent pair of the core blocks 51a, 51b, and 51c together, the core blocks 51a, 51b, and 51c are caulked, welded, or bonded, for example. The thickness direction indicated in FIGS. 14 and 15 refers to a thickness direction of the core blocks 51a, 51b, and 51c, and coincides with or is parallel to a centerline C1 of the core blocks 51a, 51b, and 51c.

In the foregoing description, after the core plates 50 are stacked to form the core blocks 51a, 51b, and 51c, the core blocks 51a, 51b, and 51c are each circumferentially shifted and stacked to form the stator core 24. However, this is not to be construed in a limiting sense. For example, while all of the core plates 50 that constitute the stator core 24 are being continuously stacked, orientation of the core plates 50 may be circumferentially shifted each time a predetermined number of the core plates 50 are stacked so that the stator core 24 including the core blocks 51a, 51b, and 51c may be formed. That is, in the foregoing description, the plate stacking step S100 and the block rotating and stacking step S110 are separately set. However, this is not to be construed in a limiting sense. The core plates 50 may be continuously stacked to form the stator core 24 as the single core stacking step.

Coil Assembling Step, Coil Insertion Step

Figure 16:
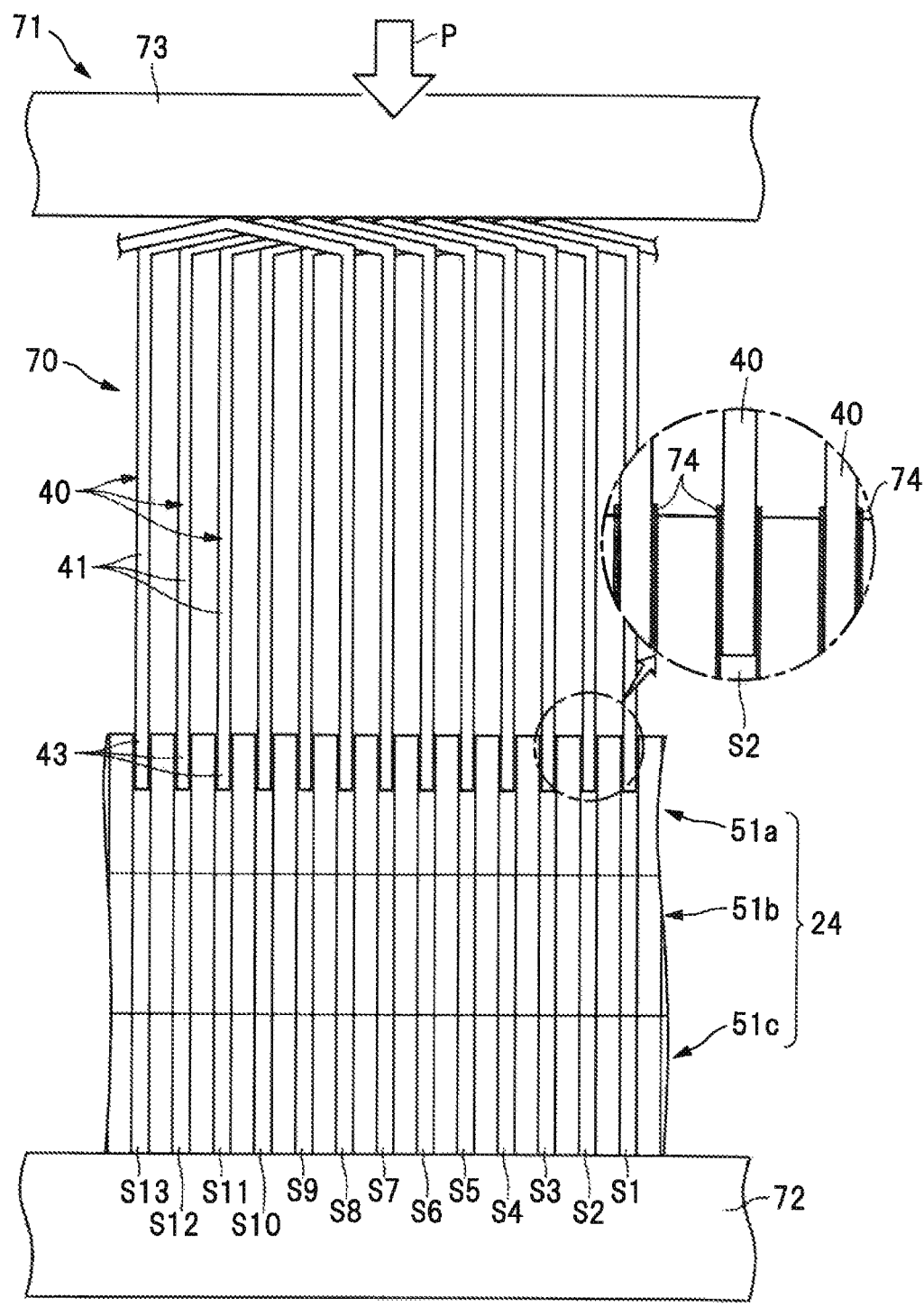
FIG. 16 is a diagram illustrating an example as to how a coil insertion step is performed.

FIG. 16 is a diagram illustrating an example as to how a coil insertion step is performed. It is noted that FIG. 16 partly illustrates the stator core 24 and a coil croup 70, described later. As illustrated in FIG. 10, the manufacturing steps of the stator 20 include: a coil assembling step S120 of assembling the segment coils 40 so as to form the coil group 70; and a coil insertion step S130 of inserting the coil group 70 into the slots S1 to S48 of the stator core 24.

As illustrated in FIG. 16, at the coil insertion step S130, the coil group 70 including the segment coils 40 assembled at the coil assembling step S120 are inserted into the slots S1 to S48 of the stator core 24. In one embodiment, the coil group 70 may serve as a "conductor group". The stator core 24 is mounted on a bed 72 of a press device 71, and the joint end portions 43 of the coil group 70 are inserted into the slots S1 to S48 of this stator core 24. When a slide 73 of the press device 71 is lowered to press the coil group 70 in a direction indicated by arrow P, the coil sides 41 of the coil group 70 are inserted into the slots S1 to S48 of the stator core 24. It is noted that as illustrated in an enlarged portion in FIG. 16, an insulative sheet 74 of aramid, for example, which is also referred to as insulator, is interposed between the slots S1 to S48 and the segment coils 40.

Coil Sending Step, Coil Welding Step, Varnish Impregnation Step

As illustrated in FIG. 10, as the manufacturing steps of the stator 20, the coil insertion step S130 is followed by a coil bending step S140, a coil welding step S150, and a varnish impregnation step S160. As illustrated in FIG. 8 above, at the coil bending step S140, the joint end portions 43 of the segment coils 40 that protrude from the one end surface 45 of the stator core 24 are bent in such a manner that the joint end portions 43 of the segment coils 40 form the conductor joint portions 47. At the coil welding step S150, the conductor joint portions 47 undergo TIG welding, for example, so that the segment coils 40 that constitute the coil group 70 are joined to complete the stator coil SC. At the varnish impregnation step S160, varnish of resin and organic solvent, for example, is spread through gaps between the stator core 24 and the stator coil SC so as to firmly secure the stator coil SC to the stator core 24.

Holding Configuration of Segment Coils by Stator Core

Figure 17:
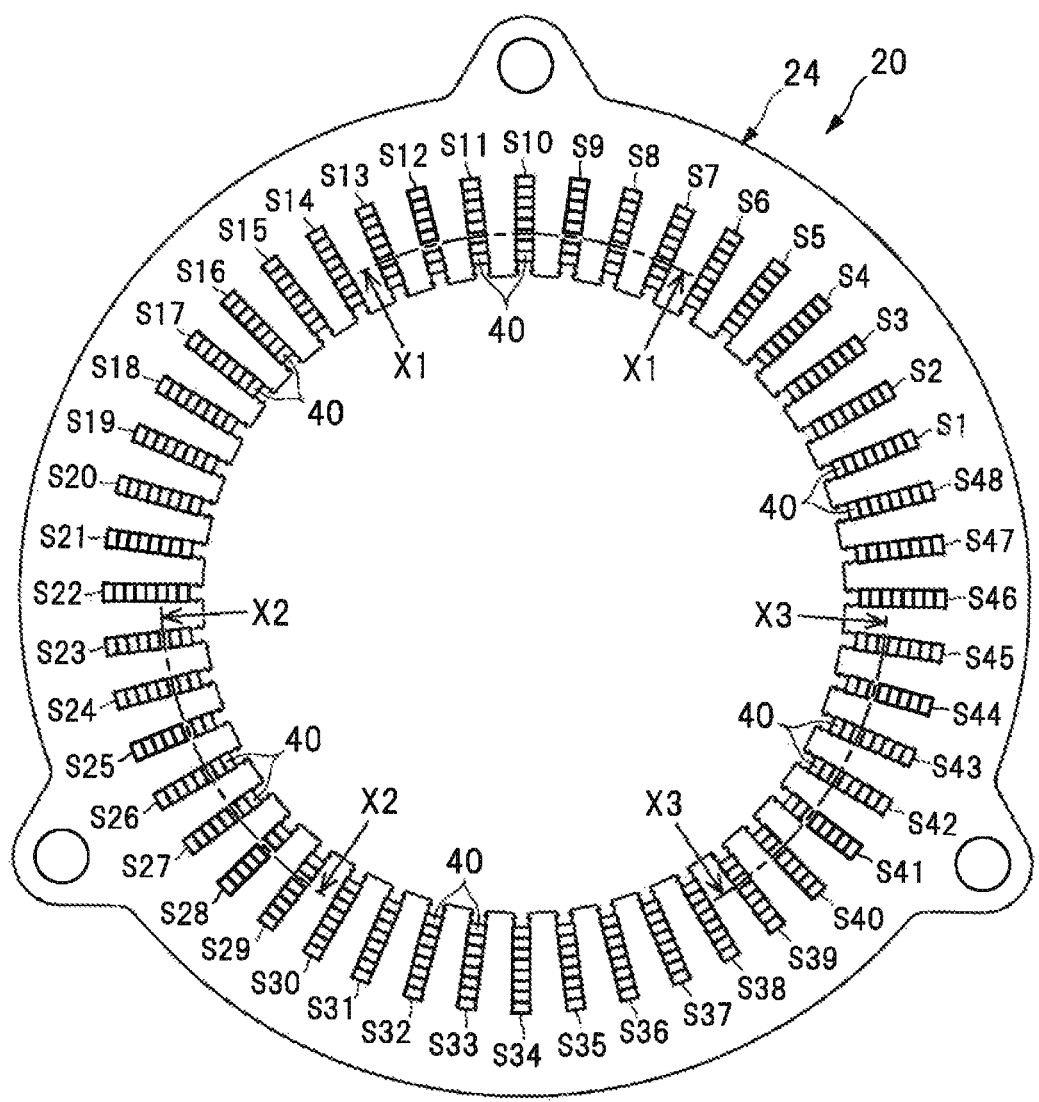
FIG. 17 is a cross-sectional view of the stator, taken along line A-A in FIG. 2.
Figure 18:
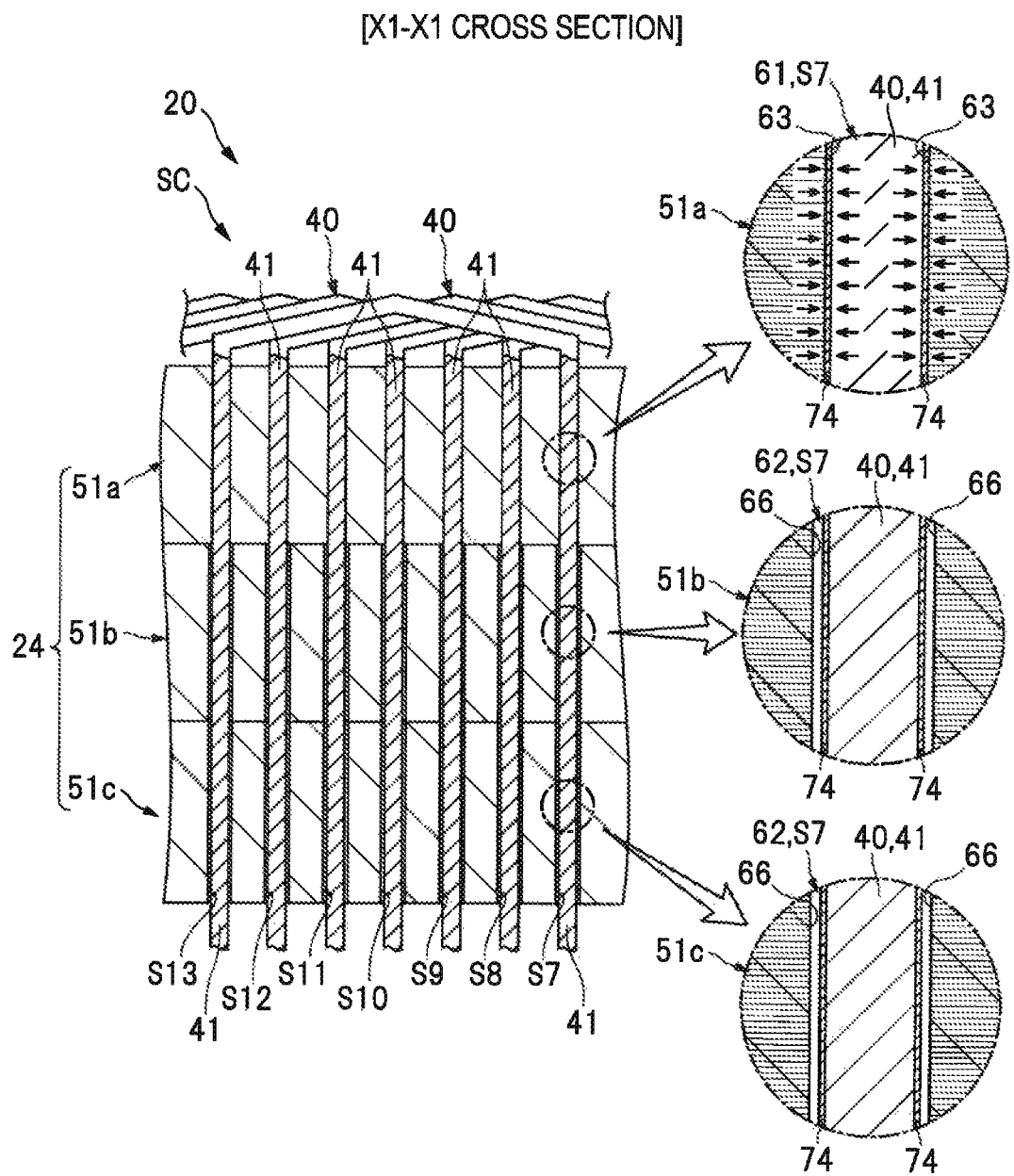
FIG. 18 is a cross-sectional view taken along line X1-X1 in FIG. 17.
Figure 19:
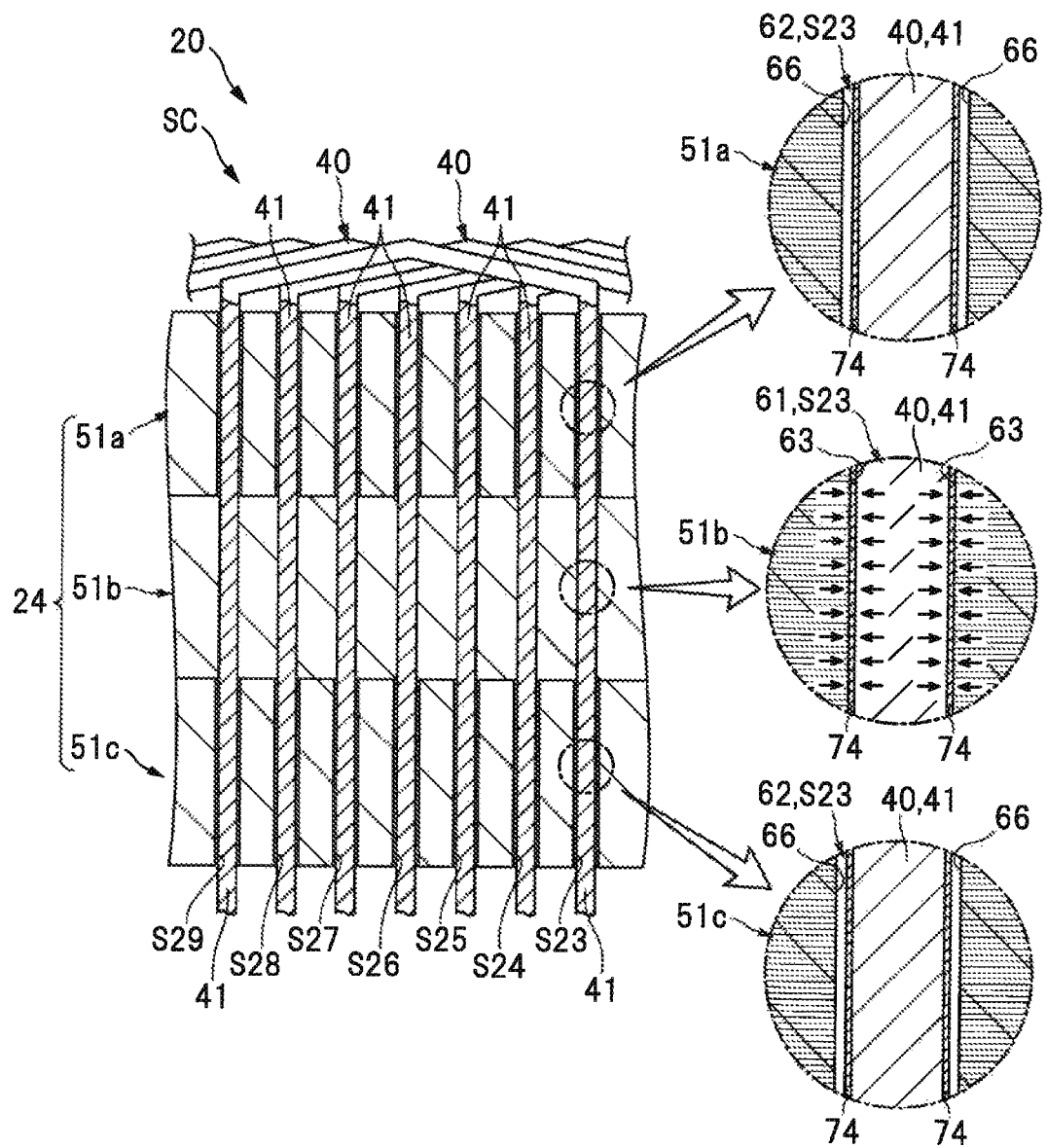
FIG. 19 is a cross-sectional view taken along line X2-X2 in FIG. 17.
Figure 20:
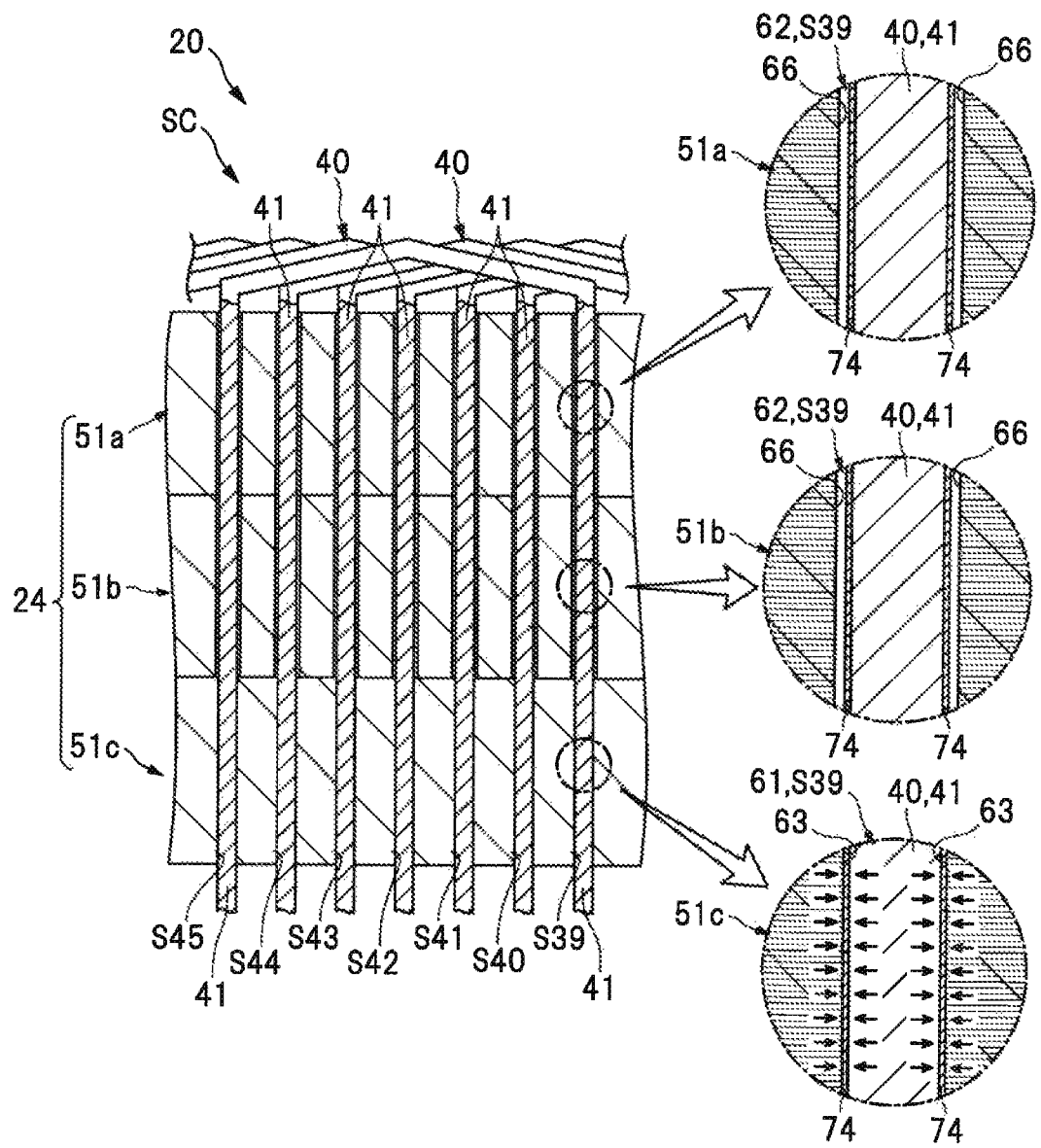
FIG. 20 is a cross-sectional view taken along line X3-X3 in FIG. 17.
Figure 21:
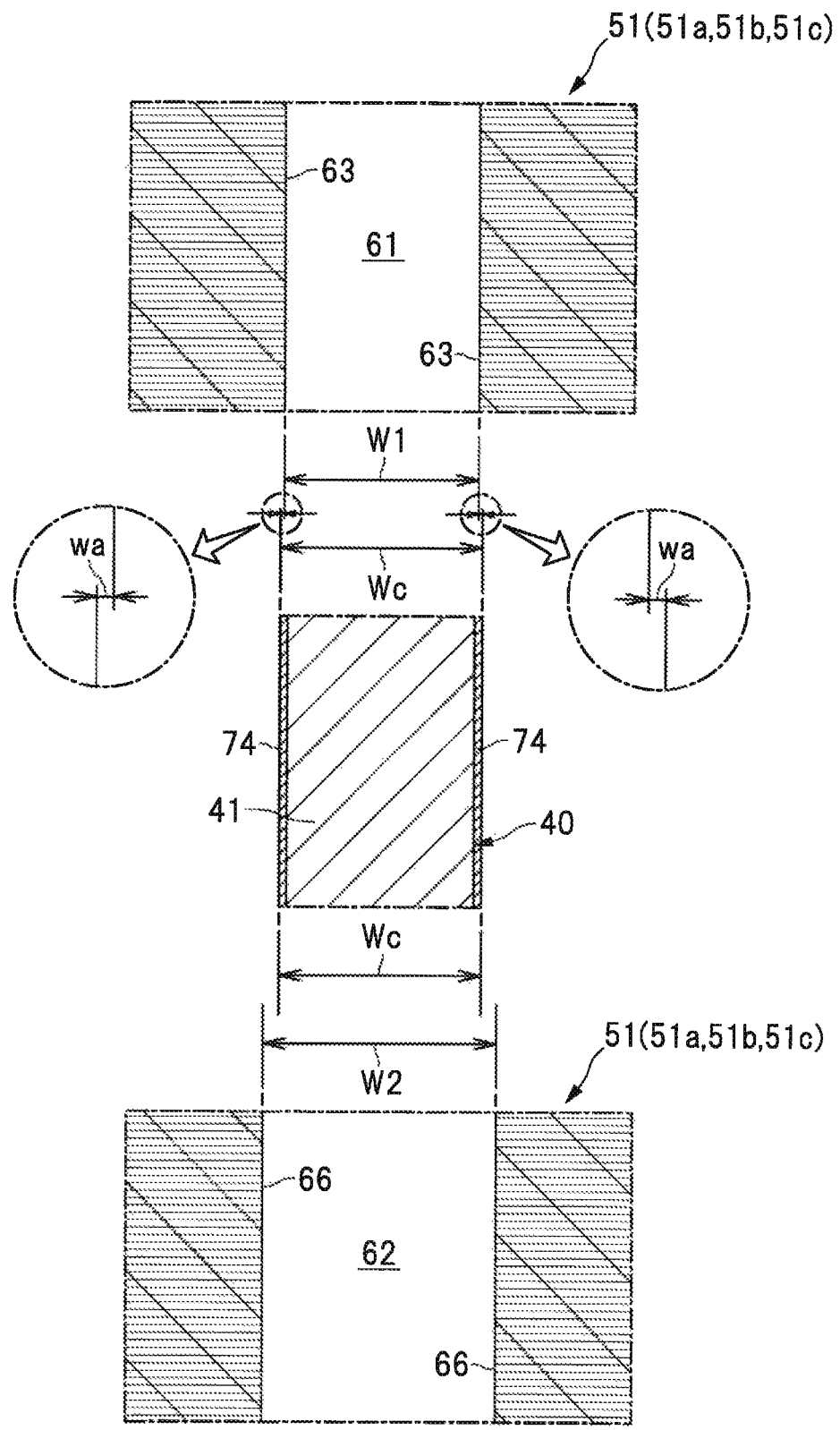
FIG. 21 is a diagram illustrating an example of widths of the segment coil, a first groove, and a second groove.

FIG. 17 is a cross-sectional view of the stator 20, taken along line A-A in FIG. 2. FIG. 18 is a cross-sectional view taken along line X1-X1 in FIG. 17. FIG. 19 is a cross-sectional view taken along line X2-X2 in FIG. 17. FIG. 20 is a cross-sectional view taken along line X3-X3 in FIG. 17. FIG. 21 is a diagram illustrating an example of widths of the segment coil 40, the first groove 61, and the second groove 62. It is noted that FIG. 21 illustrates the widths of the segment coil 40, the first groove 61, and the second groove 62 before the coil group 70 is inserted into the stator core 24.

As illustrated in FIG. 14 above, the core blocks 51 are each circumferentially shifted by 120° and stacked (rotated and stacked) so that the stator core 24 having the slots S1 to S48 and constituted of the core blocks 51 having the first grooves 61 and the second grooves 62 is manufactured. Consequently, as illustrated in FIG. 18, at the X1-X1 cross section, the slots S7 to S13 of the stator core 24 are configured with the first grooves 61 of the core block 51a and the second grooves 62 of the core blocks 51b and 51c. It is noted that although FIG. 18 illustrates the slots S7 to S13, the slots S1 to S16 are similarly configured with the first grooves 61 of the core block 51a and the second grooves 62 of the core blocks 51b and 51c.

As illustrated in FIG. 19, at the X2-X2 cross section, the slots S23 to S29 of the stator core 24 are configured with the first grooves 61 of the core block 51b and the second grooves 62 of the core blocks 51a and 51c. It is noted that although FIG. 19 illustrates the slots S23 to S29, the slots S17 to S32 are similarly configured with the first grooves 61 of the core block 51b and the second grooves 62 of the core blocks 51a and 51c. As illustrated in FIG. 20, at the X3-X3 cross section, the slots S39 to S45 of the stator core 24 are configured with the first grooves 61 of the core block 51c and the second grooves 62 of the core blocks 51a and 51b. It is noted that although FIG. 20 illustrates the slots S39 to S45, the slots S33 to S48 are similarly configured with the first grooves 61 of the core block 51c and the second grooves 62 of the core blocks 51a and 51b.

As illustrated in FIG. 21, the width of the segment coil 40 inserted in each of the slots S1 to S48, namely, a width of the coil side 41 and the insulative sheet 74 covering the coil side 41, is set at "Wc". The width of the first groove 61 that partly forms each of the slots S1 to S48 is set at "W1", and the width of the second groove 62 that partly forms each of the slots S1 to S48 is set at "W2". The width Wc of the segment coil 40 is greater than the width W1 of the first groove 61. That is, an interference wa is provided between the first groove 61 and the segment coil 40 in such a manner that during coil insertion, the side surfaces 63 of the first groove 61 are pressed by the coil sides 41. Meanwhile, the width Wc of the segment coil 40 is smaller than the width W2 of the second groove 62. That is, no interference is provided between the second groove 62 and the segment coil 40, and during coil insertion, the side surfaces 66 of the second groove 62 are not strongly pressed by the coil sides 41.

As described above, because the interference wa is provided between the first groove 61 and the segment coil 40, compressive stress is applied to both of the first groove 61 and the segment coil 40 as indicated by arrow enlarged portions in FIGS. 18 to 20. That is, the first groove 61 and the segment coil 40 can be firmly secured to each other by providing the interference wa so that a natural value, namely, a natural frequency of the mass-produced stators 20 can be prevented from deviating. Moreover, the segment coil 40 can reduce runout of each of the teeth T so as to enhance the natural frequency of the stator 20.

When the slots S1 to S48 are configured with the first grooves 61, insertion resistance of the coil group 70 into the stator core 24 is increased by such a large degree that a load onto the press device 71 is increased. In view of this, the slots S1 to S48 of the stator core 24 are configured with a combination of the first grooves 61 and the second grooves 62. This can reduce an excessive increase in insertion resistance of the coil group 70 into the stator core 24 so that the load on the press device 71 can be reduced to prevent manufacturing equipment costs from increasing.

Furthermore, because the stator core 24 is formed by circumferentially shifting and stacking each of the core blocks 51, the slots S1 to S48 configured with the first grooves 61 and the second grooves 62 can be formed using the core plates 50 of the identical shape. This can avoid an increase in the number of components so that manufacturing costs of the stator 20 can be prevented from increasing. It is noted that the core plates 50 that constitute the stator core 24 being of the identical shape means that positions, numbers, and shapes of the first grooves 61 and the second grooves 62 formed in the core plates 50 are the same.

First Modified Example of Core Block

Figure 22:
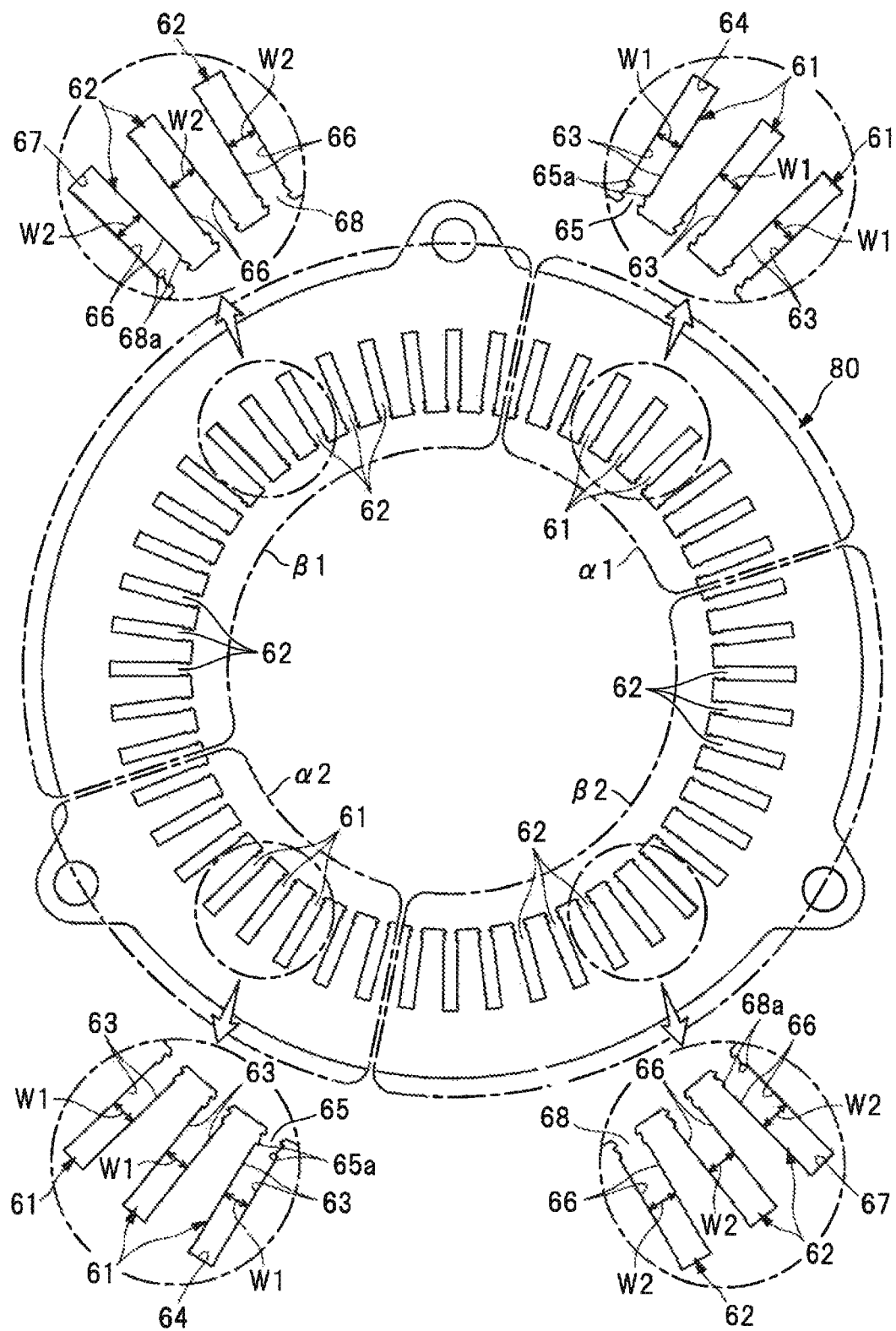
FIG. 22 is a diagram illustrating a core block in a first modified example.

In the example illustrated in FIG. 13, in the core block 51, the first grooves 61 are formed in a range of the predetermined angle (120°), and the second grooves 62 are formed in a range of the predetermined angle (240°). However, this is not to be construed in a limiting sense. FIG. 22 is a diagram illustrating a core block 80 in a first modified example. As illustrated in FIG. 22, the grooves 61 and 62 corresponding to the above-described slots S1 to S48 are formed in an inner-peripheral portion of the core block 80. In one embodiment, the core block 80 may serve as a "plate group". The grooves 61 and 62 formed in the core block 80 include the first grooves 61 having a width set at "W1", and the second grooves 62 having a width set at "W2" greater than "W1". As indicated by ranges α1 and α2, the first grooves 61 cover two ranges of a predetermined angle (60°). As indicated by ranges β1 and β2, the second grooves 62 cover two ranges of a predetermined angle (120°). In this manner, the first grooves 61 are formed in the divided ranges, and the second grooves 62 are formed in the divided ranges. Even in this case, when the stator core 24 is formed by circumferentially shifting and stacking each of the core blocks 80 in substantially the same manner as the above-described stator core 24, the slots S1 to S48 can be configured with the first grooves 61 and the second grooves 62.

Second Modified Example of Core Block

Figure 23:
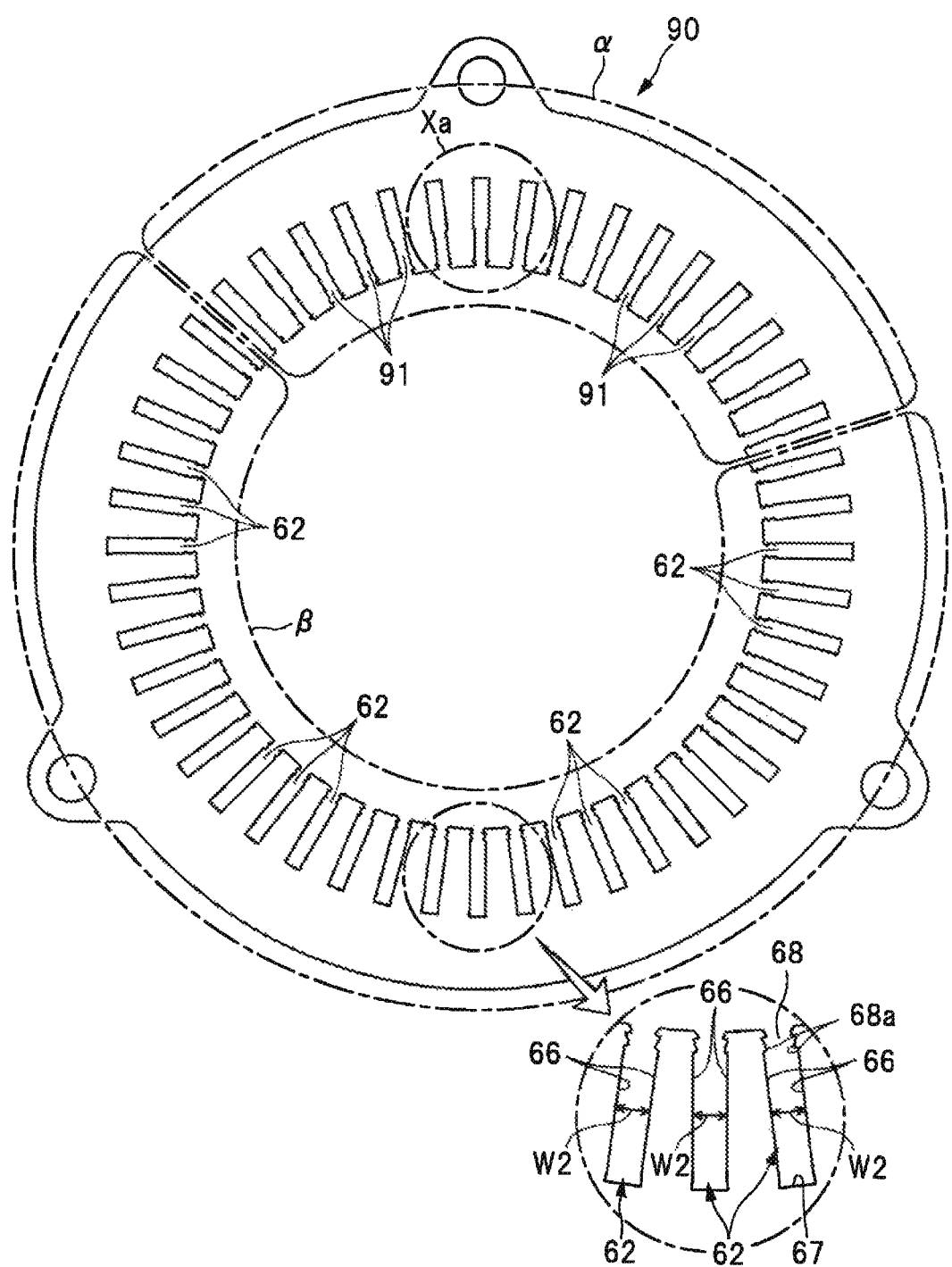
FIG. 23 is a diagram illustrating a core block in a second modified example.
Figure 24:
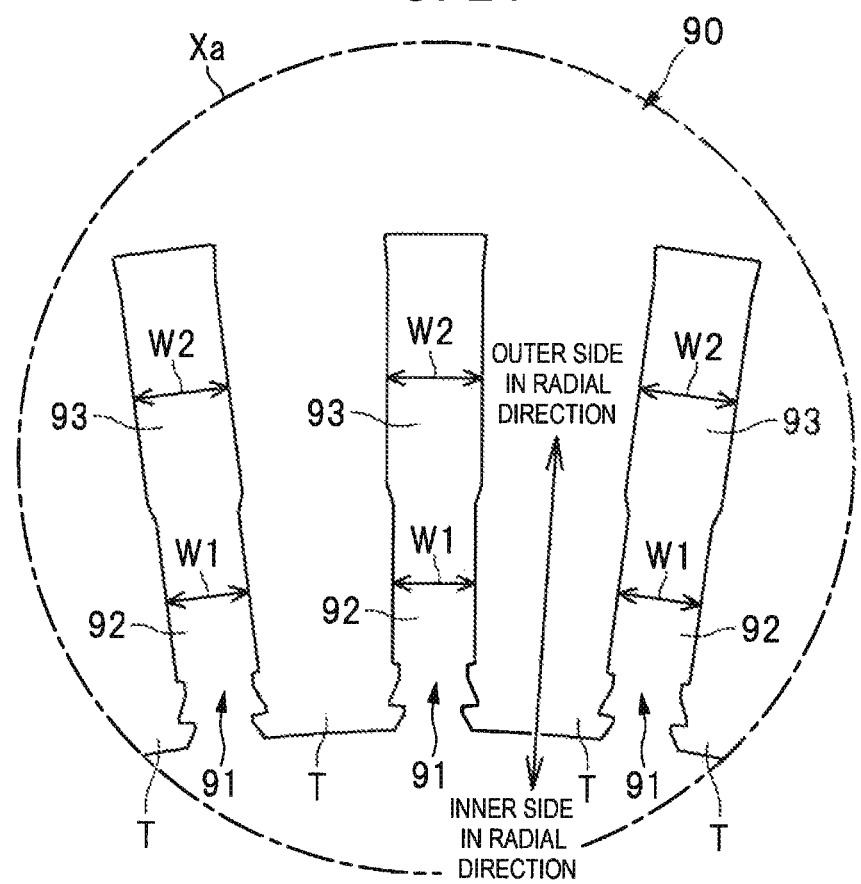
FIG. 24 is a diagram illustrating first grooves of the core block.
Figure 25:
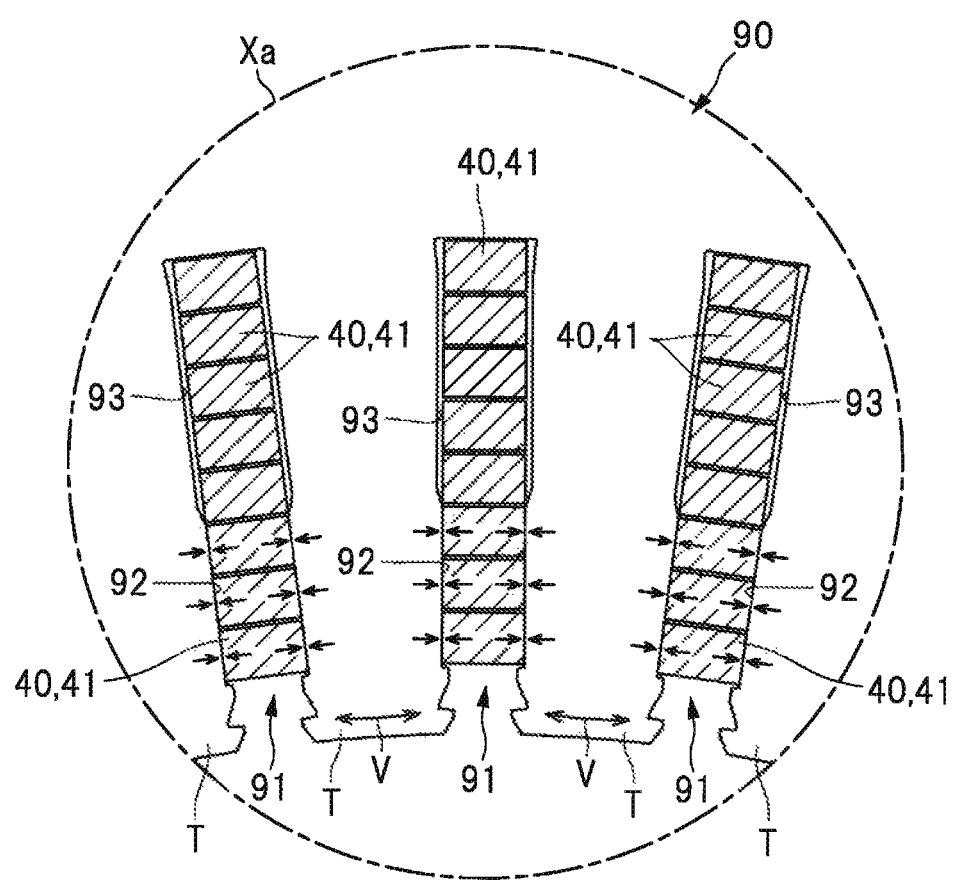
FIG. 25 is a diagram illustrating the first grooves where the segment coils are inserted.

In the example illustrated in FIG. 13, the width W1 of the first grooves 61 is uniform. However, this is not to be construed in a limiting sense. The first grooves 61 may have a width varying in accordance with a position. FIG. 23 is a diagram illustrating a core block 90 in a second modified example FIG. 24 is a diagram illustrating first grooves 91 of the core block 90. FIG. 25 is a diagram illustrating the first grooves 91 where the segment coils 40 are inserted. It is noted that FIGS. 24 and 25 illustrate an enlarged range Xa in FIG. 23.

As illustrated in FIG. 23, the grooves 91 and 62 corresponding to the above-described slots S1 to S48 are formed in an inner-peripheral portion of the core block 90. In one embodiment, the core block 90 may serve as a "plate group". As illustrated in FIGS. 23 and 24, the grooves 91 and 62 formed in the core block 90 include the first grooves 91 partly having a width set at "W1", and the second grooves 62 having a width set at "W2" greater than "W1". As illustrated in FIG. 24, the first grooves 91 each include an inner groove portion 92 opened to an inner side in the radial direction of the core block 90, and an outer groove portion 93 continuous from the inner groove portion 92 and extending to an outer side in the radial direction of the core block 90. A width of the inner groove portion 92 is set at "W1", and a width of the outer groove portion 93 is set at "W2" greater than "W1".

The width W1 of the inner groove portion 92 and the width W2 of the outer groove portion 93 are the same as the widths W1 and W2 indicated in FIG. 21 above. That is, the width W1 of the inner groove portion 92 is smaller than the width Wc of the segment coil 40, and the width W2 of the outer groove portion 93 is greater than the width Wc of the segment coil 40. Thus, substantially same interference as the above-described interference wa is provided between the inner groove portion 92 of the first groove 91 and the segment coil 40. It is noted that in the illustrated example, the width W2 of the outer groove portion 93 of the first groove 91 and the width W2 of the second groove 62 are equal to each other. However, this is not to be construed in a limiting sense. The widths of the outer groove portion 93 and the second groove 62 may be different from each other.

When the segment coil 40 is inserted into each of the first grooves 91, compressive stress is applied to both of the inner groove portion 92 and the segment coil 40 as indicated by arrows in FIG. 25, so that the first grooves 91 and the segment coils 40 can be firmly secured to each other by providing the interference. In this manner, distal ends of the teeth T are restrained by the segment coils 40 so as to positively reduce vibration (indicated by arrows V) of the teeth T, thus preventing a deviation in the natural frequency of the mass-produced stators 20.

In order to effectively reduce vibration of the teeth T, the distal ends of the teeth T are restrained more desirably than base ends of the teeth T. In view of this, in the example illustrated in FIGS. 24 and 25, the first grooves 91 are configured with the inner groove portions 92 and the outer groove portions 93, and the inner groove portions 92 are narrower than the outer groove portions 93. With the first grooves 91 of this configuration, the number of the segment coils 40 secured in the first grooves 91 can be reduced while vibration of the teeth T of the stator core 24 is reduced. This can reduce an excessive increase in insertion resistance of the coil group 70 into the stator core 24 so that the load on the above-described press device 71 can be reduced to decrease manufacturing equipment costs.

The disclosure is not limited to the foregoing embodiments, and various modifications can be made thereto within the scope that does not depart from the gist thereof. In the description above, the segment coils 40 are connected in series to constitute each of the phase coils Cu, Cv, and Cw. However, this is not to be construed in a limiting sense. The segment coils 40 may be connected in parallel to constitute each of the phase coils Cu, Cv, and Cw. In the illustrated example, the eight segment coils 40 are inserted into each slot. However, this is not to be construed in a limiting sense. For example, more than eight segment coils 40 may be inserted into each slot, and less than eight segment coils 40 may be inserted into each slot. In the foregoing description, the stator core 24 where the number of the slots is 48 is used. However, this is not to be construed in a limiting sense. A stator core with another number of the slots may be used.

In the foregoing description, the width Wc of the segment coils 40 is greater than the width W1 of the first grooves 61. However, this is not to be construed in a limiting sense. The width Wc of the segment coils 40 may be equal to the width W1 of the first grooves 61. That is, even when the width Wc of the segment coils 40 is equal to the width W1 of the first grooves 61, gaps between the segment coils 40 and the first grooves 61 are cancelled so that vibration of the teeth T can be reduced by the segment coils 40, thus preventing a deviation in the natural frequency of the mass-produced stators 20. It, is noted that when the segment coils 40 are not covered with the insulative sheet 74, the width of the coil sides 41 of the segment coils 40 may be equal to the width W1 of the first grooves 61 or may be greater than the width W1 of the first grooves 61.

In the example illustrated in FIG. 14, the three core blocks 51a, 51b, and 51c are used to constitute the stator core 24. However, this is not to be construed in a limiting sense. The two core blocks 51 may be used to constitute the stator core 24, and the four core blocks 51 or more may be used to constitute the stator core 24. In the foregoing description, in circumferentially shifting and stacking each of the core blocks 51a, 51b, and 51c, the core blocks 51a, 51b, and 51c are each circumferentially shifted by 120°. However, this is not to be construed in a limiting sense. The core blocks 51a, 51b, and 51c may be each circumferentially shifted by another angle. In the example illustrated in FIG. 14, the core blocks 51a, 51b, and 51c have the same thickness as one another. However, this is not to be construed in a limiting sense. The core blocks 51a, 51b, and 51c may be different in thickness from one another. That is, the number of the core plates 50 that constitute each of the core blocks 51a, 51b, and 51c may be the same, or the number of the core plates 50 that constitute each of the core blocks 51a, 51b, and 51c may be different from one another.

In the example illustrated in FIG. 13, the core block 51 includes the 16 first grooves 61 and the 32 second grooves 62. However, this is not to be construed in a limiting sense. For example, even in the stator core 24 configured with the three core blocks 51 and having the 48 slots, the 15 first grooves 61 or less may be formed in the core block 51, and the 17 first grooves 61 or more may be formed in the core block 51. That is, in the foregoing description, although all of the slots S1 to S48 are configured with the first grooves 61 and the second grooves 62, this is not to be construed in a limiting sense. The first grooves 61 may be used to form some of the slots S1 to S48, and the second grooves 62 may be used to form some of the slots S1 to S48. In other words, one or more of the slots S1 to S48 may be configured with the first grooves 61 and the second grooves 62.

According to the embodiment of the disclosure, the plate groups each have, as grooves that form the slots, the first grooves and the second grooves wider than the first grooves, and one or more of the slots are configured with the first grooves and the second grooves. This can prevent a deviation in the natural frequency of the stator.

The invention claimed is:

1. A stator for a rotary electric machine, the stator comprising:
    a stator core comprising plate groups circumferentially shifted from and stacked on one another, the stator core having slots; and
    a stator coil comprising segment conductors inserted in the slots respectively, the stator coil being assembled with the stator core,
    wherein the plate groups each comprise grooves that form the slots, the grooves including
        first grooves, and
        second grooves wider than the first grooves, and
    wherein at least one of the slots is configured with one or more of the first grooves and one or more of the second grooves.

2. The stator according to claim 1, wherein all of the slots are each configured with the one or more of the first grooves and the one or more of the second grooves.

3. The stator according to claim 2,
    wherein the first grooves each have
        an inner groove portion opened to an inner side in a radial direction of the plate group, and
        an outer groove portion continuous from the inner groove portion and extending to an outer side in the radial direction of the plate group, and
    wherein the inner groove portion is narrower than the outer groove portion.

4. The stator according to claim 3,
    wherein an interference is provided between the first grooves and the segment conductors, and
    wherein no interference is provided between the second grooves and the segment conductors.

5. The stator according to claim 2, wherein core plates that constitute the plate groups have an identical shape.

6. The stator according to claim 5,
    wherein an interference is provided between the first grooves and the segment conductors, and
    wherein no interference is provided between the second grooves and the segment conductors.

7. The stator according to claim 2,
    wherein an interference is provided between the first grooves and the segment conductors, and
    wherein no interference is provided between the second grooves and the segment conductors.

8. The stator according to claim 1,
    wherein the first grooves each have
        an inner groove portion opened to an inner side in a radial direction of the plate group, and
        an outer groove portion continuous from the inner groove portion and extending to an outer side in the radial direction of the plate group, and
    wherein the inner groove portion is narrower than the outer groove portion.

9. The stator according to claim 8, wherein core plates that constitute the plate groups have an identical shape.

10. The stator according to claim 9,
    wherein an interference is provided between the first grooves and the segment conductors, and
    wherein no interference is provided between the second grooves and the segment conductors.

11. The stator according to claim 8,
    wherein an interference is provided between the first grooves and the segment conductors, and
    wherein no interference is provided between the second grooves and the segment conductors.

12. The stator according to claim 1, wherein core plates that constitute the plate groups have an identical shape.

13. The stator according to claim 12,
    wherein an interference is provided between the first grooves and the segment conductors, and
    wherein no interference is provided between the second grooves and the segment conductors.

14. The stator according to claim 1,
    wherein an interference is provided between the first grooves and the segment conductors, and
    wherein no interference is provided between the second grooves and the segment conductors.

15. A method of manufacturing a stator for a rotary electric machine, the method comprising:
    stacking core plates to form a stator core comprising plate groups circumferentially shifted from and stacked on one another; and
    inserting segment conductors composing a conductor group respectively into slots formed in the stator core,
    wherein the plate groups each comprise grooves that form the slots, the grooves including
        first grooves, and
        second grooves wider than the first grooves, and
    wherein at least one of the slots is configured with one or more of the first grooves and one or more of the second grooves.

* * * * *